US008363535B2

(12) United States Patent
Parnaby et al.

(10) Patent No.: US 8,363,535 B2
(45) Date of Patent: *Jan. 29, 2013

(54) FREQUENCY DOMAIN ECHO AND NEXT CANCELLATION

(75) Inventors: Gavin D. Parnaby, Irvine, CA (US); George A. Zimmerman, Rolling Hills Estates, CA (US); Chris Pagnanelli, Huntington Beach, CA (US); William W. Jones, Aliso Veijo, CA (US)

(73) Assignee: Marvell International Ltd., Hamilton (BM)

( * ) Notice: Subject to any disclaimer, the term of this patent is extended or adjusted under 35 U.S.C. 154(b) by 1333 days.

This patent is subject to a terminal disclaimer.

(21) Appl. No.: 12/074,256

(22) Filed: Feb. 29, 2008

(65) Prior Publication Data

US 2008/0239939 A1 Oct. 2, 2008

Related U.S. Application Data

(63) Continuation-in-part of application No. 11/273,347, filed on Nov. 14, 2005, now Pat. No. 7,352,687, which is a continuation of application No. 10/424,424, filed on Apr. 28, 2003, now abandoned.

(51) Int. Cl.
*H04J 1/12* (2006.01)
*H04J 3/10* (2006.01)

(52) U.S. Cl. .................. 370/201; 370/286; 370/287

(58) Field of Classification Search .................. None
See application file for complete search history.

(56) References Cited

U.S. PATENT DOCUMENTS

| | | | |
|---|---|---|---|
| 4,359,778 A | 11/1982 | Lee | |
| 4,583,235 A | 4/1986 | Domer et al. | |
| 4,878,232 A | 10/1989 | Fisher | |
| 4,956,838 A | 9/1990 | Gilloire et al. | |
| 5,222,084 A | 6/1993 | Takahashi | |
| 5,249,200 A | 9/1993 | Chen et al. | |
| 5,293,402 A | 3/1994 | Crespo et al. | |
| 5,305,307 A | 4/1994 | Chu | |
| 5,307,405 A | 4/1994 | Sih | |
| 5,315,585 A | 5/1994 | Iizuka et al. | |
| 5,388,124 A | 2/1995 | Laroia et al. | |
| 5,633,863 A | 5/1997 | Gysel et al. | |

(Continued)

FOREIGN PATENT DOCUMENTS

| | | |
|---|---|---|
| DE | 196 24 928 | 1/1998 |
| EP | 0250048 | 12/1987 |

(Continued)

OTHER PUBLICATIONS

Oscar Agazzi, et al., "10Gb/s PMD Using PAM-5 Trellis Coded Modulation", Broadcom, *IEEE 802.3* Albuquerque, New Mexico, Mar. 6-10, 2000, 38 pages.

(Continued)

*Primary Examiner* — Xavier Wong
*Assistant Examiner* — Leon Andrews

(57) ABSTRACT

A cancellation system is disclosed for processing incoming and outgoing signals in a transform domain to create a cancellation signal for reducing or removing unwanted interference. Data is ordered based on Good-Thomas indexing into a two dimensional array in a buffer. The two dimensional array may have $l_r$ rows and $l_w$ columns. From the buffer, the columns of data undergo a Winograd small transform. The rows of data undergo a Cooley-Tukey operation to complete the transform operation into the frequency domain. Multipliers scale the transformed data to generate a cancellation signal in the frequency domain. Inverse (Cooley-Tukey) and Winograd transforms perform inverse processing on the cancellation signal to return the cancellation signal or data to the time domain. Re-ordering the data and combination of the cancellation signal or data with incoming or outgoing signals achieve interference cancellation.

32 Claims, 18 Drawing Sheets

U.S. PATENT DOCUMENTS

| | | | |
|---|---|---|---|
| 5,646,958 A | 7/1997 | Tsujimoto | |
| 5,825,753 A | 10/1998 | Betts et al. | |
| 5,856,970 A | 1/1999 | Gee et al. | |
| 5,896,452 A | 4/1999 | Yip et al. | |
| 5,903,546 A | 5/1999 | Ikeda et al. | |
| 5,909,466 A | 6/1999 | Labat et al. | |
| 6,028,929 A | 2/2000 | Laberteaux | |
| 6,081,502 A | 6/2000 | Paneth et al. | |
| 6,088,827 A | 7/2000 | Rao | |
| 6,147,979 A | 11/2000 | Michel et al. | |
| 6,160,790 A | 12/2000 | Bremer | |
| 6,167,082 A | 12/2000 | Ling et al. | |
| 6,178,162 B1 | 1/2001 | Dal Farra et al. | |
| 6,201,831 B1 | 3/2001 | Agazzi et al. | |
| 6,212,225 B1 | 4/2001 | Agazzi | |
| 6,226,332 B1 | 5/2001 | Agazzi et al. | |
| 6,236,645 B1 | 5/2001 | Agazzi | |
| 6,249,544 B1 | 6/2001 | Azazzi et al. | |
| 6,252,904 B1 | 6/2001 | Agazzi et al. | |
| 6,253,345 B1 | 6/2001 | Agazzi et al. | |
| 6,259,729 B1 | 7/2001 | Seki | |
| 6,272,173 B1 | 8/2001 | Hatamian | |
| 6,285,653 B1 | 9/2001 | Koeman et al. | |
| 6,297,647 B2 | 10/2001 | Kirk et al. | |
| 6,304,598 B1 | 10/2001 | Agazzi et al. | |
| 6,324,170 B1 | 11/2001 | McClennon et al. | |
| 6,351,531 B1 | 2/2002 | Tahernezhaadi et al. | |
| 6,356,555 B1 | 3/2002 | Rakib et al. | |
| 6,433,558 B1 | 8/2002 | Sciacero et al. | |
| 6,463,041 B1 | 10/2002 | Agazzi | |
| 6,480,532 B1 | 11/2002 | Vareljian | |
| 6,493,448 B1 | 12/2002 | Mann et al. | |
| 6,553,085 B1 | 4/2003 | Trans | |
| 6,584,160 B1 | 6/2003 | Amrany et al. | |
| 6,618,480 B1 | 9/2003 | Polley et al. | |
| 6,665,402 B1 | 12/2003 | Yue et al. | |
| 6,687,235 B1 | 2/2004 | Chu | |
| 6,751,255 B1 | 6/2004 | Reuven et al. | |
| 6,792,038 B2 | 9/2004 | Agazzi | |
| 6,813,311 B1 | 11/2004 | Pal et al. | |
| 6,819,709 B1 | 11/2004 | Agazzi et al. | |
| 6,826,226 B1 | 11/2004 | Sahlin et al. | |
| 6,862,326 B1 | 3/2005 | Eran et al. | |
| 6,898,281 B1 | 5/2005 | Larsson et al. | |
| 6,961,373 B2 | 11/2005 | Jones | |
| 7,002,897 B2 | 2/2006 | Jones et al. | |
| 7,110,449 B2 | 9/2006 | Heo et al. | |
| 7,133,425 B2 | 11/2006 | McClellan | |
| 7,742,386 B2 * | 6/2010 | Jones et al. | 370/201 |
| 2001/0036160 A1 | 11/2001 | Curran et al. | |
| 2002/0067824 A1 | 6/2002 | Wang | |
| 2002/0106016 A1 | 8/2002 | Egelmeers et al. | |
| 2002/0176492 A1 | 11/2002 | Zangi et al. | |
| 2002/0191535 A1* | 12/2002 | Sugiyama et al. | 370/208 |
| 2002/0191552 A1 | 12/2002 | Watkinson | |
| 2003/0063663 A1 | 4/2003 | Bryant | |
| 2003/0067888 A1 | 4/2003 | Bina et al. | |
| 2003/0099208 A1 | 5/2003 | Graziano et al. | |
| 2004/0001427 A1 | 1/2004 | Belotserkovsky et al. | |
| 2004/0001540 A1 | 1/2004 | Jones | |
| 2004/0022311 A1 | 2/2004 | Zerbe et al. | |
| 2004/0125487 A9 | 7/2004 | Sternad et al. | |
| 2005/0157811 A1 | 7/2005 | Bjerke et al. | |
| 2007/0237270 A1 | 10/2007 | Mezer et al. | |
| 2008/0239939 A1* | 10/2008 | Parnaby et al. | 370/201 |

FOREIGN PATENT DOCUMENTS

| | | |
|---|---|---|
| JP | 2003-250193 | 9/2003 |
| JP | 2006-524970 A | 11/2006 |
| JP | 2009-116472 | 5/2009 |
| KR | 10-2007-0018663 | 2/2007 |
| WO | WO-2004/098088 A2 | 11/2004 |

OTHER PUBLICATIONS

Jamie E. Kardontchik, "4D Encoding in Level-One's Proposal for 1000BAS-T", Advanced Micro Devices, Aug. 21, 1997—Rev. B, pp. 1-24.

Erich F. Haratsch, et al., "A 1-Gb/s Joint Equalizer and Trellis Decoder for 1000BASE-T Gigabit Ethernet", *IEEE Journal of Solid State-Circuits*, vol. 36, No. 3, Mar. 2001, pp. 374-384.

Mehdi Hatamian, et al., "Design Considerations for Gigabit Thernet 1000Base-T Twisted Pair Transceivers", IEEE 1998 Custom Integrated Circuits Conference, pp. 335-342.

M.P. Sellers, et al., "Stabilized Precoder for Indoor Radio Communications", IEEE Communications Letters, vol. 4, No. 10, Oct. 2000, pp. 315-317.

"Wirescope 350—Understanding ELFEXT", © 2000 Agilent Technologies, 2 pages.

David A. Johns, et al., "Integrated Circuits for Data Transmission Over Twisted-Pair Channels", IEEE Journal of Solid-State Circuits, vol. 32, No. 3, Mar. 1997, pp. 398-406.

Prof. David Johns, University of Toronto, "Equalization", © D.A. Johns 1997, 29 pages.

David Smalley, "Equalization Concepts: A Tutorial", Atlanta Regional Technology Center, Texas Instruments, pp. 1-29, Oct. 1994.

Shao-Po Wu, et al., "FIR Filter Design via Spectral Factorization and Convex Optimization", to appear as Chapter 1 of Applied Computational Control, Signal and Communications, Biswa Datta Editor, Birkhauser, 1977, pp. 1-33.

M. Tomlinson, "New Automatic Equalizer Employing Modulo Arithmetic," Electronic Letters, vol. 7, pp. 138-139, 1971.

H. Harashima and H. Miyakawa, "Matched-Transmission Technique for Channels for Intersymbol Interference," IEEE Transactions on Communications, vol. COM-20, No. 4, pp. 774-780, Aug. 1972.

P. Kabal and S. Pasupathy, "Partial-Response Signaling," IEEE Transactions on Communications, vol. COM-23, No. 9, pp. 921-934, Sep. 1975.

R.F.H. Fischer and J.B. Huber, "Comparison of Precoding Schemes for Digital Subscriber Lines," IEEE Transactions on Communications, vol. 45, No. 3, pp. 334-343, Mar. 1997.

Gottfried Ungerboeck, "Trellis-Coded Modulation with Redundant Signal Sets Part I: Introduction", IEEE Communications Magazine, Feb. 1987, vol. 25, No. 2, pp. 5-21.

"Gigabit Ethernet Over Category 5", Copyright 2000-2001 Agilent Technologies, 12 pages.

David Crawford, "Adaptive Filters", © David Crawford 1996, pp. 1-5.

Richard D. Wesel, et al., "Achievable Rates for Tomlinson-Harashima Precoding", IEEE Transactions on Information Theory, vol. 44, No. 2, Mar. 1998, pp. 824-831.

Wolfgang H. Gerstacker, et al., "Blind Equalization Techniques for xDSL Using Channel Coding and Precoding", AEÜ Intl. J. Electr. Commun., May 1999, pp. 1-4.

Chip Fleming, "A Tutorial on Convolutional Coding with Viterbi Decoding", © 1999-2002 Spectrum Applications, pp. 1-6.

"ELFEXT—Introduction", Fluke Networks™, © 2000, pp. 1-2.

"Iowegian's dspGuru FIR FAQ Part 2: Properties", © 1999-2000 Iowegian International Corp., pp. 1-4.

28.5 Protocol Implementation Conformance Statement (PICS) Proforma for Clause 28, Physical Layer Link Signaling for 10 Mb/s, 100 Mb/s and 1000 Mb/S Auto-Negotiation on Twisted Pair, IEEE std. 802.3ab-1999 © 1999 IEEE, pp. 6-14, and 18-44.

M. Li S. Wang, et al., "FIR Optimisation as Pre-emphasis of High-Speed Backplane Data Transmission", Electronic Letters, 8th Jul. 2004, vol. 40, No. 14, 2 pages.

Wu S., Boyd S., Vandenberghe, L.; "FIR Filter Design via Semidefinite Programming and Spectral", Biswas Datta editor, 1997; pp. 1-6.

Gi-Hong Im, et al., "Performance of a Hybrid Decision Feedback Equalizer Structure for CAP-Based DSL Systems", IEEE Transactions on Signal Processing vol. 49, No. 8, Aug. 2001, pp. 1768-1785.

Eyuboglu M V., "Flexible Precoding for V.Fast", Data Transmission—Advances in Modem and ISDN Technology and Applications, 1992., UK, IEE, UK 1992, pp. 13-18.

"Transformer Polarity", Copyright 2002 Kilowatt Classroom, 11C, 1 page.

"Application Note—Design of H.F. Wideband Power Transformers; Part II -EC07213", Philips Semiconductors, Mar. 23, 1998, pp. 1-10.

Fischer et al, W.H. Gerstacker, and J.B. Huber, "Dynamics Limited Precoding, Shaping, and Blind Equalization for Fast Digital Transmission Over twisted Pair Lines," IEEE Journal on Selected Areas in Communications, vol. 13, No. 9, pp. 1622-1633, 1995.

Fleming, "Description of Algorithms (Part 1)," http://home.netcom.com/~chip.f/viterbi/algrthms.html, 7 pages, Mar. 2001.

Chaplais, "Fast Fourier Transform," http://cas.ensmp.fr/~chaplais/Wavetour_presentation/transformees/Fourier/FFTUS.html, 2 pages, Oct. 1998.

Cruz, "Continuous Time Aperiodic Signals: The Fourier Transform," http://ecu.ucsd.edu/~cruz/ece.101/notes/node32.html, 2 pages, Jul. 2002.

O'Haver, "Convolution," http://www.wam.umd.edu/~toh/spectrum/Convolution.html, 2 pages, Feb. 2000.

"Technical Information—Use of Ferrites in Broadband Transformers," http://www.fair-rite.com/newfair/pdf/Broadband.pdf, Fair-Rite Products Corp., 14th Edition, pp. 170-173, 2001.

"Convolution by DFT," http://www.gresilog.com/english/excommen/doc/convtd.htm, 3 pages, Mar. 2001.

"Definition of Minimum Phase," http://www.ccrma.stanford.edu/~jos/filters/Definition_Minimum_Phase.html, 3 pages, Aug. 2004.

Herkersdorf et al., "A Scalable SDH/SONET Framer Architecture for Datacom and Telco Applications," Proceedings of the International Zurich Seminar on Broadband Communications, pp. 191-198, Feb. 2000.

Tzou, "Electric Machinery: Chp. 2 Transformers—Dot Convention to Denote the Polarity of a Transformer," http://pemclab.cn.nctu.edu.tw/W3elemac/W3slide/ch2.xformer/sld009.htm, 1 page, Sep. 18, 1995.

Chen, et al., "Current Mirror Circuit with Accurate Mirror Gain for Low Beta Transistors," Circuits and Systems, 2001, ISCAS 2001, Proceedings of the 2001 IEEE International Symposium on Circuits and Systems, vol. 1, pp. 536-540, May 2001.

"Introduction to DSP-filtering: FIR filters," http://www.bores.com/courses/intro/filters/4_fir.htm, 2 pages. BORES Signal Processing, Apr. 1998.

"QAM_VR: QAM Demodulator with Variable Rate," sci-worx, 2 pages, 2004.

Diminico et al,. "Development of Equal Level Far-End Crosstalk (ELFEXT) and Return LossSpecifications for Gigabit Ethernet Operation on Category 5 Copper Cabling," http://www.ieee802.org/3/an/public/material/diminico_IWCS.PDF, 10 pages, Oct. 5, 1998.

Silva et al., "Precoder Circuit for Channels with Multipath Dispersion," Telecommunications Institute, Department of Electronics and Telecommunications Engineering, the University of Aveiro—University Campus, Portugal, 4 pages, 1999.

Jezek et al, "New Algorithm for Spectral Factorization and its Practical Application," Proceedings of, European Control Conference, pp. 3104-3109, May 18, 2001.

"Tutorial: Adaptive Filter, Acoustic Echo Canceller, and its Low Power Implementation," Freehand Communications AB, 6 pages, 2006.

"ADSL Tutorial," http://www.dslforum.org/aboutdsl/adsl_tutorial.html, 3 pages, 2001.

Nussbaumer, "Fast Fourier Transform and Convolution Algorithms," pp. 133-144, Second Corrected and Updated Edition, Springer-Verlag, (1982).

Notice of Reasons for Rejection in corresponding Japanese Application No. 2010-548675, mailed Oct. 9, 2012.

Lu et al., "A Hybrid Parallel M-D FFT Algorithm without Interprocessor Communication, " 1993 IEEE Int'l Conf. on Acoustics, Speech, and Signal Processing, vol. 3, pp. 281-284, Apr. 27, 1993.

* cited by examiner

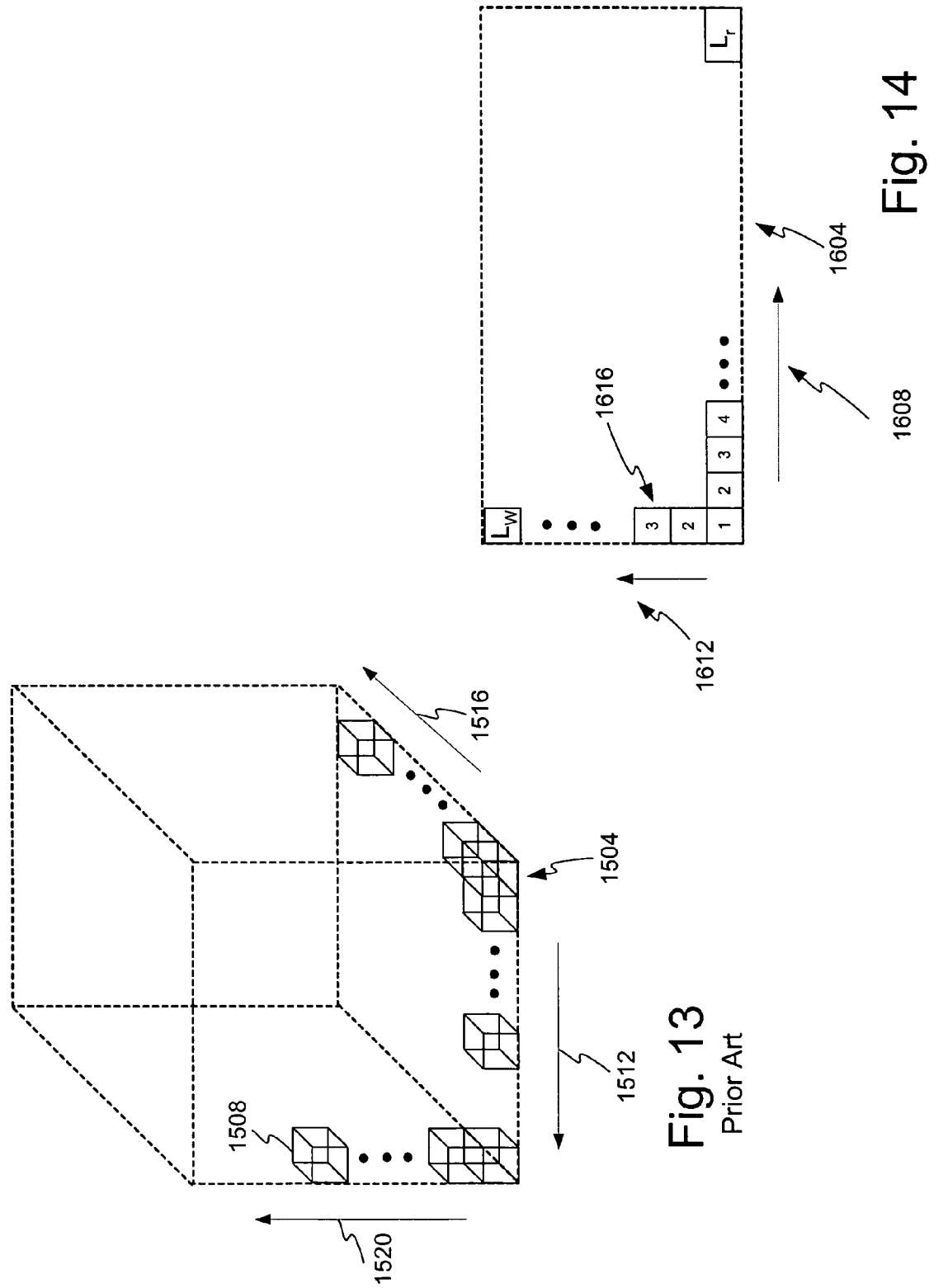

FREQUENCY DOMAIN ECHO AND NEXT CANCELLATION

PRIORITY CLAIM

This application is a continuation in part and claims priority to U.S. patent application Ser. No. 11/273,347, now U.S. Pat. No. 7,352,687, filed on Nov. 14, 2005 U.S. Pat. No. 7,352,687 and entitled Mixed Domain Cancellation, which is a continuation of U.S. patent application Ser. No. 10/424,424 filed on Apr. 28, 2003, now abandoned.

FIELD OF THE INVENTION

The invention relates to echo and next cancellation in a communication system, an in particular to a frequency domain technique for echo and next cancellation.

RELATED ART

As is commonly understood, there is a continuing need to increase the data communication rate. Certain communication systems are equipped with multiple channels between stations, and each station communicates using multiple channels. As a result, the total aggregate throughput is greatly increased as compared to systems that utilize a single channel. A particularly noteworthy example is in current 1000BASE-T and future multiple gigabit Ethernet, where all four twisted copper pairs of the Category 5 unshielded twisted pair (UTP) cable are used for transmission of data.

While multi-channel communication links speed data transfer, such systems suffer from drawbacks. One such drawback is that multi-channel communication links suffer from coupling. In wired communications systems, a major source of interference is reflections of the transmitted signal due to imperfect impedance matching, often due to connectors. In systems which use multiple pairs, such as Ethernet, interference is caused both on the pair a signal is transmitted on ('echo') and on the other pairs (near end crosstalk, known as 'next'). These signals degrade the performance of the receiver, and inhibit operation, particularly when a full duplex link is established over long distances. This is particularly true when the received signal has much lower power than the reflections.

In an ideal communication link, each channel of a multi-channel link would be completely decoupled from the other channels. Thus, each received signal would consist of the desired far end (FE) signal and a small amount of random noise. However, an ideal environment rarely exists, and hence the interference of NEXT and echo invades the signal that is received. Thus, the received signal is largely a combination of the far end signal and unwanted NEXT and echo components. This undesirably limits the detection of the far end signal such that some form of active interference cancellation must be implemented.

Therefore, transceivers employ time domain echo and next cancellers, which are adaptive filters. These structures use their knowledge of the transmitted signal to iteratively update a model of the transfer function so that they can accurately reproduce the echo and next signals, and cancel them at the receiver. At high sampling rates however, the echo response can be many taps long. Interference cancellation is complex, and implementation of interference cancellation in an electronic system requires a large degree of processing capability which for an integrated circuit has implications on area and power requirements.

In this regard, the prior art interference cancellation processing consumes an undesirably large amount of electrical power and generates an undesirable amount of heat. These factors lead to increase cost of ownership for products that incorporate prior art interference cancellation systems.

One approach to improve efficiency and reduce power consumption and complexity is to use a frequency domain canceller. Typically a set of transmit samples are collected in a block, the block is transformed into the frequency domain, and then filtering is applied in the frequency domain. Finally the data is transformed back into the time domain and used for cancellation. This reduces the number of multiplies needed, which can result in significant power reduction, particularly for a hardware implementation.

The disadvantage of this approach is that the block operations introduce substantial latency into the canceller. Excessive latency can limit the application of communications systems; end-users may prefer other technologies. For example, for applications such as scientific computing, excessive latency lowers the performance of 'clusters' of high performance computers.

A second issue with the application of the frequency domain approach is that well-known FFT structures are most efficient for complex signals. However, directly using complex Cooley-Tukey based transforms for real signals results in substantial inefficiencies. In a hardware implementation this translates into increased power consumption, which is undesirable. One way to efficiently use a complex transform engine for real signals is through the use of a 'real adjust' operation. This enables an N-point real FFT to be calculated using an N/2-point complex FFT and N additional complex multiplications, as well as some low-cost addition operations. This technique is described in 12.3 FFT of Real Functions, Sine and Cosine Transforms, pages 510-520, Numerical Computing in C: The Art of Scientific Computing, Second Edition, William H. Press, Saul A. Teukolsky, William T. Vetterling, Brian P. Flannery, 1992. Techniques such as the real adjust are often used in software implementations, and they can also be used in hardware. Typically in hardware systems the FFT is implemented using a pipelined architecture, to maximize power efficiency and minimize latency. Use of this structure places restrictions on the output ordering. These efficient implementations of FFT algorithms produce outputs in an order which does not match that required by the real adjust algorithm. This breaks the pipeline structure of the datapath, and requires that additional buffering be introduced to line up the data for the real adjust process. This adds significant latency and power to the canceller. Furthermore, during the inverse transform an inverse real adjust operation must be performed, which consumes further power and increases latency for the same reasons.

Other known operations or transforms used to implement real or complex FFTs include the Cooley-Tukey algorithm, split-radix transforms, real-split-radix transforms, Winograd transforms, Prime-Factor transforms, the Bruun algorithm, Rader's algorithm, Bluestein's algorithm but these operations do not overcome the drawbacks of the prior art.

Latency can be reduced by using a smaller block size in the frequency domain transform. Upon implementation however, this increases power, as the block operation (transform-multiply-inverse transform) must then be performed more frequently. This is particularly a concern for very long filters. Another proposed solution to reduce latency is to 'parallelize' the transform and/or multiplications by using more physical circuitry to perform the calculation in parallel, but this introduces complications in the implementation and can lead to inefficiencies and increased power consumption. Furthermore in a hardware implementation parallelization increases area which increases power loss through leakage even when the circuit is not active.

SUMMARY

To overcome the drawbacks of the prior art and provide additional benefits, various different embodiments and configurations are disclosed herein. Disclosed herein is a method for reducing interference in an incoming signal received at a transceiver of a multi-channel communication device comprising. This method comprises the steps of receiving, in a serial format, a signal to be transmitted over a channel, the transmitted signal to be transmitted from the transceiver. Then converting the signal to a parallel format to create data representing the signal and performing ordering on the data based on Good-Thomas ordering. Then performing Winograd transforms on the data and Cooley-Tukey transforms to create transform domain data. Thereafter, the method distributes the transform domain data to one or more multipliers and multiplies the transform domain data by one or more weighting variables to create a weighted transform domain signal. At this stage, the method performs inverse Cooley-Tukey transforms on the weighted transform domain data and then inverse Winograd transforms on the output of the inverse Cooley-Tukey transform to create cancellation data. Inverse ordering occurs on the cancellation data before converting the cancellation data to a serial format signal and combining the cancellation signal with the incoming signal to reduce interference in the incoming signal.

In one embodiment, the signal comprises two or more signals and each signal is associated with a channel in the multi-channel communication. The step of performing ordering on the data may comprise arranging the data into a two dimensional array. The two dimensional array is an array having $l_w$ rows and $l_r$ columns.

Also disclosed herein is a method for canceling interference in one or more received signals comprising receiving two or more outgoing signals and converting the two or more outgoing signals to a transform domain using a transform operation to create two or more transform domain signals. In this embodiment the transform operation comprises a Winograd small transform on the two or more outgoing signals and then performing ceiling $(l_w/2)$ Cooley-Tukey transforms on the output of the Winograd small transform to create the two or more transform domain signals. In one embodiment, the function y=ceiling[x] returns the smallest integer y which is equal to or greater than the value x. The ceiling value is the next whole number that is greater than the identified value. A floor value is the closest whole number that is less than the identified value.

This operation processes the two or more transform domain signals with two or more weighting variables to generate two or more cancellation signals in the transform domain and converts the two or more transform domain cancellation signals out of the transform domain using an inverse transform operation to obtain two or more cancellation signals. As such, the inverse transform operation comprises multiple Cooley-Tukey transforms and multiple Winograd transforms. The operation then combines the two or more cancellation signals with two or more receive signals to cancel interference in the one or more received signals.

In one configuration the two or more outgoing signals are arranged into a two dimensional array. It is also contemplated that the two or more outgoing signals are arranged in the two dimensional array based on Good-Thomas indexing. The processing may comprise an element by element multiply operation. In addition, the step of receiving one or more outgoing signals may comprise receiving four outgoing signals and combining the cancellation signal with a received signal comprises combining four cancellation signals with a received signal. The method may also comprise performing overlap processing on the one or more outgoing signals and the one or more cancellation signals.

A cancellation system for reducing interference in a received signal in a multi-channel communication device is also disclosed such that the cancellation system for each channel comprises an input for receiving an outgoing signal at a first transceiver, the outgoing signal in a first domain. This system also comprises one or more transform units configured to manipulate the outgoing signal into a second domain signal and provide the second domain signal to at least one multiplier associated with each channel. In this embodiment the transform unit comprises at least one Winograd transform and at least one Cooley-Tukey transform. One or more multipliers are provided and configured to multiply the second domain signal with one or more weighting variables to create two or more cancellation signals in the second domain. Also part of this embodiment is one or more inverse transform units configured to perform an inverse transform on the two or more cancellation signals in the second domain to create a cancellation signal in the second domain. In this embodiment the transform unit comprises at least one Cooley-Tukey transform and at least one Winograd transform. To perform the cancellation, a subtractor is provided and configured to subtract the cancellation signal that is in the second domain from a received signal.

In one embodiment the one or more transform units are implemented in hardware. The system may further comprise one or more summing junctions configured to add the two or more cancellation signals in the second domain from the one or more multipliers to generate a combined cancellation signal in the second domain and output the combined cancellation signal in the second domain to the one or more inverse transform units. Furthermore, the system further comprises a buffer system configured to receive and order the outgoing signal into a two dimensional array and the data is ordered based on Good-Thomas indexing. In one configuration, the multi-channel communication device comprises a four channel communication device and each cancellation system generates a cancellation signal that accounts for the interference from each of the four channels. In one embodiment the system further comprises an adaptation system configured to adaptively generate weighting variables and the adaptation system comprises one or more transform units configured to convert an error signal to the second domain and an adaptation module configured to process the error signal in the second domain to generate the weighting variables.

Also disclosed herein is a cancellation system for use in a multi-channel transceiver to cancel unwanted coupling. This embodiment comprises four inputs such that each input provides data to the cancellation system and the data is in the time domain. One or more buffers configured to store data and provide and feed data into at least one Winograd transform unit configured to received data from the one or more buffers. Each Winograd transform unit is configured to perform a Winograd transform to convert the data to processed data. Also part of this embodiment is at least one Cooley Tukey transform configured to receive the processed data and perform a transform to create transform domain data. The transform domain data is provided to one or more multipliers such that each multiplier is configured to receive the transform domain data and multiply the transform domain data with a weighting variable to create cancellation data in the transform domain. One or more devices configured to combine the cancellation data in the transform domain to create a combined cancellation data in the transform domain perform cancellation and at least one Cooley-Tukey transform unit is provided and configured to receive the combined cancellation signal and perform transform to create processed combined cancellation data. In addition, at least one Winograd transform unit configured to receive the processed combined cancellation data, wherein each Winograd transform unit is configured to perform a Winograd transform to convert the processed combined cancellation data to create cancellation data in the time domain.

In one embodiment the one or more of the Cooley-Tukey transform units and the one or more of the Winograd transform units perform overlap processing and transform processing. It is also contemplated that the system may further comprise two or more devices configured to combine the cancellation signals in the transform domain. In one configuration at least one of the one or more multipliers is configured to be is shared between clock cycles.

Also disclosed herein is a method for generating a cancellation signal in a cancellation system wherein the method occurs within one or more channels of a multi-channel communication system comprising receiving data at a cancellation system. The data represents to two or more outgoing signals on the two or more channels in the multi-channel communication system. This method also processes the data using a Winograd transform and a Cooley-Tukey transform to convert each of the one or more signals into a transform domain and distributes the one or more signals in the transform domain to one or more multipliers associated with the one or more channels. Thereafter, the method multiplies the one or more signals in the transform domain by one or more weighting variables to create one or more multiplier outputs and combines the one or more multiplier outputs to create a combined transform domain cancellation signal. Then the method processes the transform domain cancellation signal to remove the cancellation signal from the transform domain.

In one embodiment the method further comprises ordering the data, prior to processing the data, using Good-Thomas indexing or an equivalent indexing. Ordering the data may comprise ordering the data into a two dimensional array. The transform domain comprises the frequency domain. The data may comprise real data. In one embodiment performing a Winograd transform on the data and then a Cooley-Tukey transform to create transform domain data results in redundant data that can be eliminated, thus reducing latency and power consumption.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

Other systems, methods, features and advantages The components in the figures are not necessarily to scale, emphasis instead being placed upon illustrating the principles of the invention. In the figures, like reference numerals designate corresponding parts throughout the different views.

FIG. 13 illustrates an exemplary prior art block structure upon which prime factor algorithm Fourier transform processing occurs.

FIG. 14 illustrates a conceptual two dimensional array.

DETAILED DESCRIPTION

Figure 1:
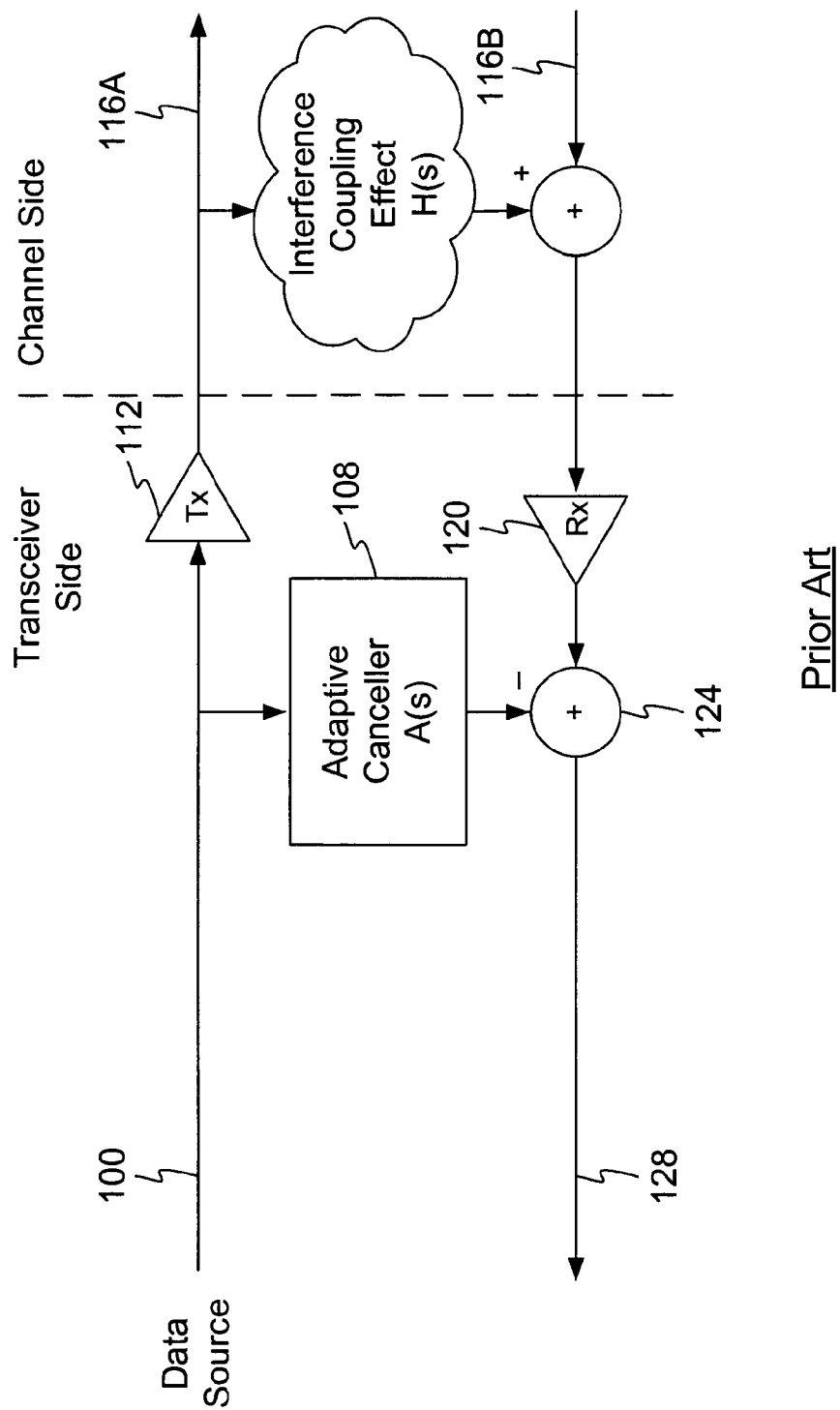
FIG. 1 illustrates a block diagram of a prior art canceller system.

The most widely recognized technique for interference cancellation is an adaptive canceller, which is illustrated in FIG. 1, as part of a transceiver. A data source input 100 connects to an adaptive canceller 108 and a transmitter 112. The output of the transmitter 112 connects to the channel 116A. A receiver 120 of the transceiver also connects to a channel 116B. The term channel should be understood to mean one or more conductors of signal paths. The output of the receiver 120 feeds into a summing junction 124. The subtractor 124 subtracts the output of the adaptive canceller 108 from the received signal. The output of the subtractor 124 is provided as the input 128 to the other aspects of the receiver processing.

The coupling of interference from one transmitter into another receiver is represented as a linear transfer function H(s). Using the transmitted signal as a reference, the adaptive canceller 108, A(s), is trained such that A(s) approximately equals H(s). The output of the subtractor 124 then consists of the desired far end signal plus a residual interference term. Although desired to minimize the residual interference term, this goal may not be fully realized due to limitations in the required complexity of the adaptive canceller 108. Typically, the adaptive canceller 108, A(s), is realized in the discrete time domain so that the adaptive canceller 108 is implemented as a digital filter A(z). In this case, the transmitter 112 and receiver 120 blocks would consist of suitable mixed-signal blocks needed to interface digital signals with the analog channel. Generally, the higher the order of this digital filter the greater the cancellation (smaller the residual). But, a high order filter undesirably incurs greater computational requirements. For the typical case where the digital filter used to derive A(z) is a tap delay line or FIR filter, the complexity is directly proportional to the number of taps, M.

Extending this structure to the multiple channel case, there would need to be $N_c^2$ digital filters, where $N_c$ is the number of channels. Thus, in a system operating under the current or future Ethernet standard and utilizing four channels, 16 digital filters would be required. In applications where the number of filter taps is large, the multiple channel extension of the typical canceller structure results in a formidable complexity requirement. For example, when extending the data rate and the length of the channels, the number of taps on an individual digital filter could rise to over four hundred taps. Combined with a high sampling rate and a multiple channel application, this many taps results in a huge requirement on the number of operations per second needed for realization. As can be appreciated, this prior art method and apparatus for echo cancellation and crosstalk mitigation are thus unsuitable for high-data-rate, multi-channel applications.

Figure 2:
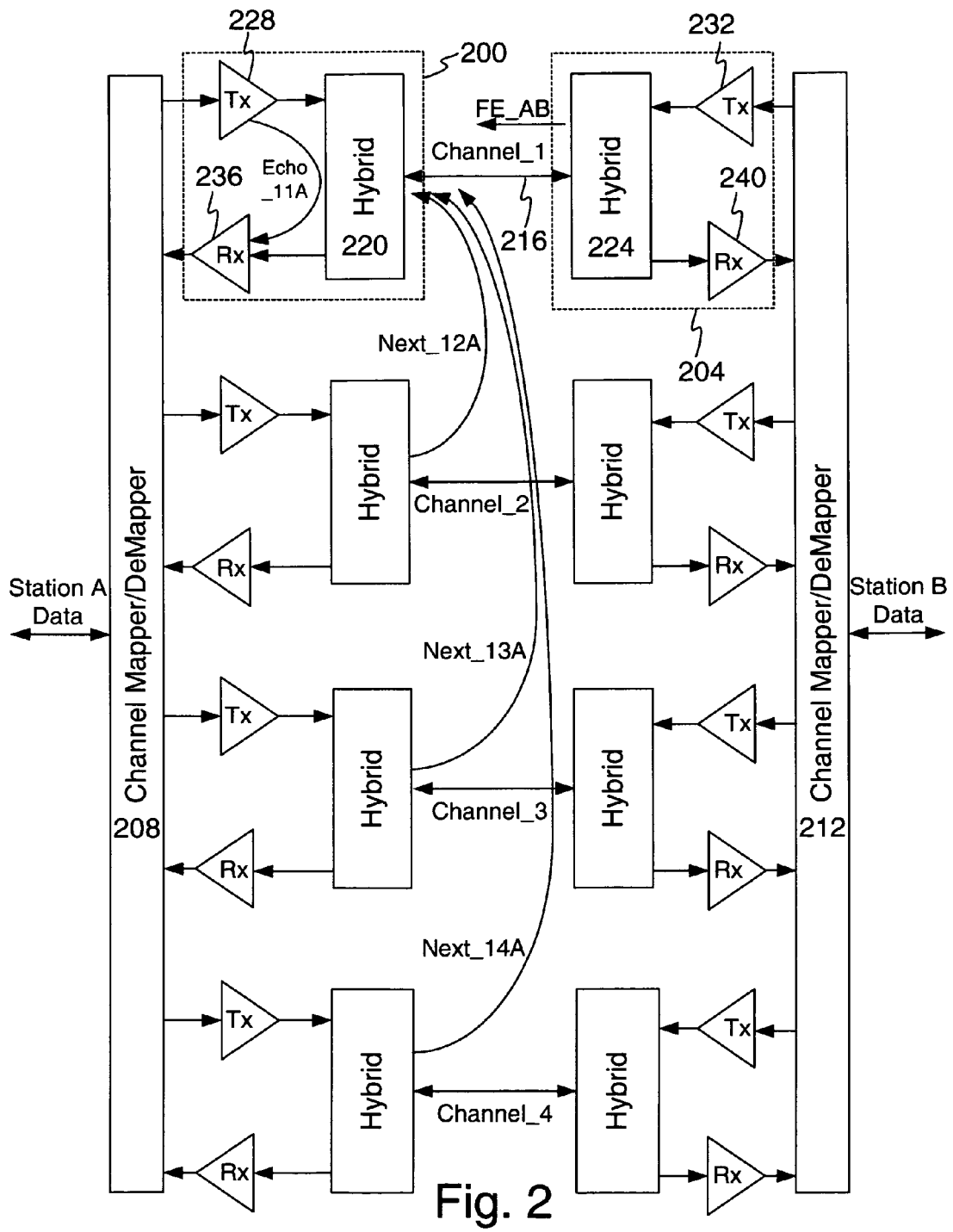
FIG. 2 illustrates a block diagram of an example embodiment of a multi-channel transceiver.

FIG. 2 illustrates the sources of interference into receiver 1 of station A. As shown, a first transceiver 200 is configured to communicate with a second transceiver 204. The first transceiver is associated with station A while the second transceiver is associated with station B. It is contemplated that the transceivers 200, 204 are incorporated within communication devices configured to communicate utilizing a multi-channel communication link. For purposes of understanding, the transceivers may connect to mapper/demapper modules 208, 212 as shown. Although shown as having four communication channels, it is contemplated that the method and apparatus discussed below may be expanded to any number of channels. In addition, the term channel should be understood to mean any medium capable of carrying a signal or data, such as but not limited to, any Category twisted pair (UTP) cabling either shielded or unshielded (e.g., 5, 5*e*, 6, 6*a*, 7 . . . etc.), wireless channels, fiber optic channels or cables, free-space optic channels, voice grade twisted pair conductors, coaxial cables, or other channels or conductors that are currently or that may become available in the future.

In addition, it is contemplated that the principles disclosed and claimed herein may also be utilized with any type of channel, including those listed above, when grouped into multi-conductor channels. For example, it is contemplated that standard telephone lines or any other type conductor or transmission medium may be grouped into bundles to create a multi-conductor channel. The processing of signals transmitted over such channels may be performed in accordance with the teachings contained herein.

A channel 216 connects the first transceiver 200 and the second transceiver 204. Each transceiver 200, 204 may comprise a hybrid 220, 224, a transmitter 228, 232, and a receiver 236, 240. A signal FE_AB is transmitted from the second transceiver 204 (station B) to the first transceiver 200 (station A) over channel 1. The term 'signal FE_AB' should be understood to mean the far end signal, with respect to station A, being transmitted to station A from station B. It is desired to isolate and process at the first transceiver 200 only the FE_AB signal that was transmitted.

Also shown in FIG. 2 are the echo and near-end crosstalk (NEXT) components that are undesirably coupled into the first channel 216 and are received by the receiver 236. Namely, echo component echo_11A is the echo interference coupled onto channel 1 from channel 1. The term echo_11A should be interpreted to mean the echo components that couple onto the first channel from the first channel of station A. Component Next_12A is the interference coupled onto channel 1 from channel 2 on the signal that is received at station A. This pattern repeats as shown for each of the other channels. Hence, Next_13A and Next_14A are the interference sources coupled onto channel 1 from channels 3 and 4 respectively. As a result of the coupling, the signal received at the first transceiver 200 consists of the desired far end signal, FE_AB, and the four interfering signals, i.e., the three NEXT signals and the echo. This pattern repeats for each of the channels. It is desired to remove the respective NEXT and echo signals on each of the received signals in each of the receivers at both station A and station B.

In many situations, the communication system performance is interference limited such that the presence of interference, such as echo and crosstalk, limits communication rates. The interference often creates data errors during the processing of a received signal, which limits transmission rates. If the interference is left in the signal, the data can often not be recovered or detected. Hence, the interference may be a limiting factor.

It is further contemplated that the transmit rate for the systems described herein may be at any frequency. As is understood, processing and transmission at high frequencies may create additional complexities that may be solved by the teachings contained herein. It is contemplated that the principles disclosed and claimed herein may be utilized with systems operating at any frequency from very low frequencies up to and including multiple giga-bit processing or transmit rates.

Figure 3:
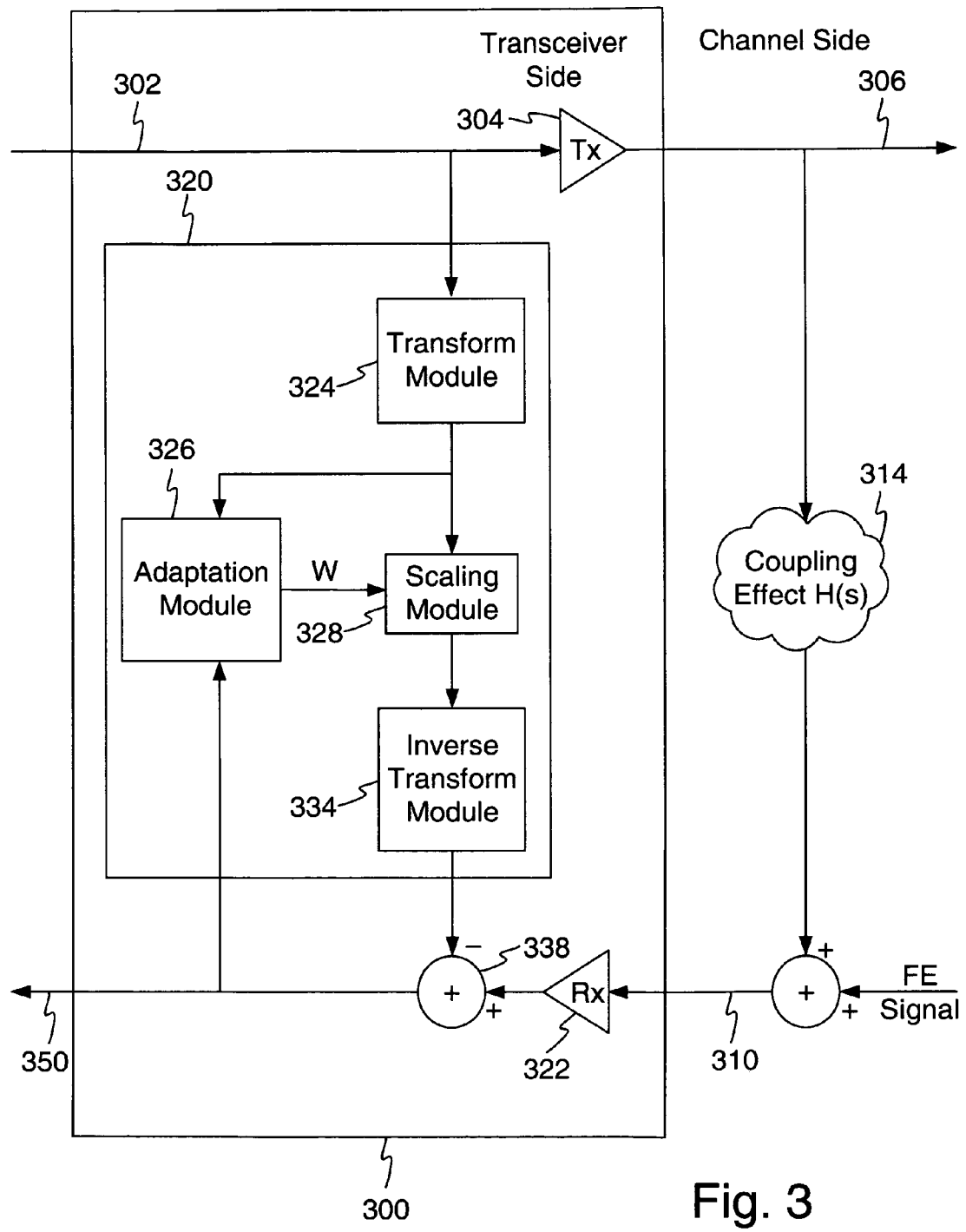
FIG. 3 illustrates a block diagram of an example embodiment of the invention.

FIG. 3 illustrates a block diagram of an example embodiment of one embodiment of the invention. In this example embodiment, the undesirably long analog or digital filters of the prior art are replaced with systems that transform the transmitted signal to a transform domain in which processing may occur. As a result, the complexity of echo and crosstalk reduction is greatly reduced. The term transform domain is defined to mean an alternative domain that is different from the original domain.

One example embodiment of a system configured to perform transform domain processing is a system configured to perform the processing in the frequency domain, which is shown in FIG. 3. It is contemplated that numerous systems of this nature may reside in a multi-channel communication device to reduce or eliminate echo and crosstalk that couples across channels. A first transceiver 300 is shown for purposes of discussion. A data source line 302 from a data source (not shown) connects to a transmitter 304 and an adaptive canceller module 320. The transmitter 304 comprises one or more devices configured to transmit the data from the data source over the channel to a second transceiver at a remote location.

As part of the transmission, it is contemplated that at least a portion of echo and crosstalk will couple onto an input 310 to the first transceiver 300. This is represented in FIG. 3 for purposes of discussion as an input coupling effect 314, having a transfer function H(s), which is combined into the received signal on input 310. Thus, the signal on input 310 comprises a far end signal (FE signal) and a signal due to the coupling, H(s), from channel 306 in the multi-channel communication system. If other channels were present, additional coupling signals would also be present on the received signal. It is desired to remove the component due to the coupling H(s) from the received FE signal. The signal received on input 310 connects to a receiver 322, which performs standard processing on the signal. The output of the receiver 322 feeds into a subtractor 338.

An adaptive canceller system 320 is configured as part of the first transceiver. In the embodiment of FIG. 3, the line 302 to the adaptive canceller system 320 connects to a transform module 324. In one embodiment, the line 302 is configured to receive an outgoing signal from a data source. The outgoing signal is eventually or concurrently provided to the transmitter 304 for transmission over the channel 306. The transform module 324 comprises a configuration of hardware, software, or both configured to processes a signal into a transform domain. The transform domain and the transform module 324 are discussed below in more detail. The output of the transform module 324 feeds into an adaptation module 326 and a scaling module 328. In one embodiment, the adaptation module 326 comprises a configuration of hardware, software or both configured to operate in and perform the functions described herein. The adaptation module 326 performs processing to dynamically generate weighting variables based on an estimate of the transfer function of the crosstalk coupling effect. The scaling module 328 comprises software, hardware or a combination of both configured to perform scaling on the transform signal responsive to the weighting variables. In another embodiment, the scaling module 328 may comprise a multiplier. The output of the scaling module 328 connects to an inverse transform module 334, which in turn has an output connected to the subtractor 338. The inverse transform module 334 comprises hardware, software, or a combination of both configured to reverse the transform operation. In one embodiment, this comprises returning the input to the inverse transform module 334 to the same domain as which the outgoing signal was in prior to transform processing by the transform module. In one embodiment, this comprises an inverse Fourier transform operation.

The subtractor 338 subtracts the output of the adaptive canceller system 320 from the received signal to thereby isolate the desired FE signal. The output of the subtractor 338, which comprises the FE signal or a signal generally similar to the FE signal, is provided as one output 350 from the transceiver 300 and as a feedback signal, for purposes of adaptation, to the adaptation module 326.

In operation, the adaptive canceller system 320 reduces the echo and the crosstalk components in the received signal. The transceiver 300 receives a signal on an output 302 to be sent over the channel 306. To reduce the echo and the crosstalk components, the signal is provided to both the transmitter 304 and the adaptive canceller system 320. The transmitter 304 processes the signal and outputs the signal onto the channel 306. During operation, the receiver 322 receives a composite signal on input 310 comprised of the FE signal and a signal coupled through H(s). The receiver 322 processes these inputs in a manner known in the art. To remove the coupled signal, the adaptive canceller system 320 is configured with transfer function that approximates the coupling function H(s). The output of the adaptive canceller system 320, herein after the cancellation signal, is subtracted from the received signal to isolate the FE signal.

To generate the cancellation signal, the input transmit signal from output 302 is subject to a transform operation in the transform module 324 to create a transformed signal. The scaling module modifies the transformed domain signal based on a weighting variable W that is generated by the adaptation module 326. The scaling module 328 utilizes the weighting variable to perform processing on the transform domain signal to generate a cancellation signal. Stated another way, the weighting variables realize the transfer function of the scaling module 328 to cause the scaling module to generate the desired cancellation signal. In one embodiment, the scaling module 328 multiplies the transform domain signal and the weighting variable to generate the one or more cancellation signals.

In one embodiment, calculation of the weighting variable by the adaptation module 326 occurs based on the least mean square (LMS) algorithm and feedback from the signal on line 350. Manipulation of the weighting variable modifies the cancellation signal, which in turn modifies the output of subtractor 338. As a result, the feedback to the adaptation module 326 is also modified to allow the adaptive canceller system 320 to adapt to the changes in crosstalk and echo. It is contemplated that other forms of adaptation may be utilized other than LMS, such as but not limited to stochastic gradient, constrained LMS, Recursive Least Squares (RLS), Fast Kalman, Gradient Lattice and Least Squares Lattice.

Thereafter, the output of the scaling module 328 is subject to an inverse transform operation, to return the signal to the original domain. This cancellation signal, restored to the original domain, is provided to the subtractor 338, where it is subtracted from the receiver output thereby removing the crosstalk signal from the received signal and isolating the FE signal.

Figure 4:
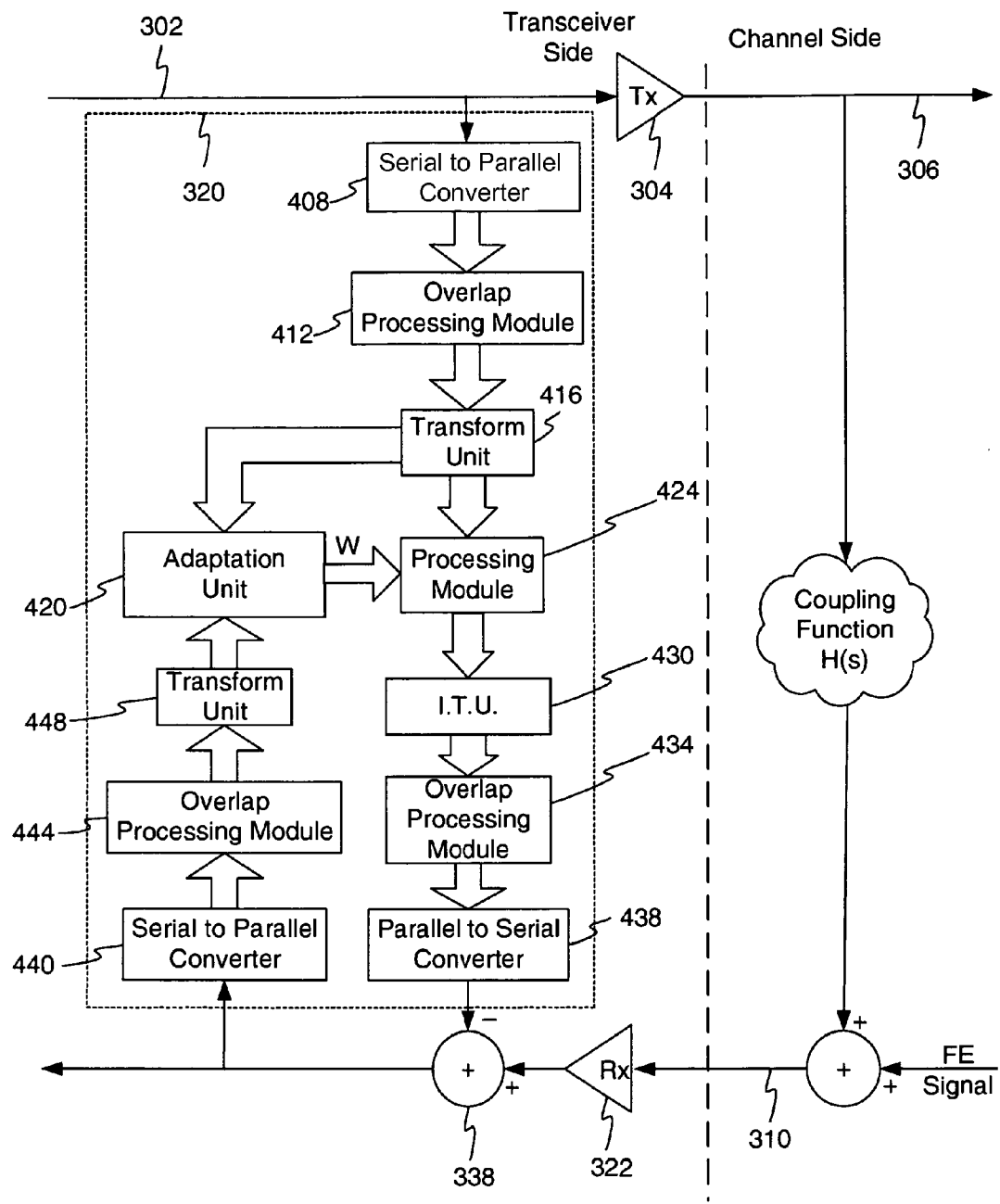
FIG. 4 illustrates a block diagram of an exemplary embodiment of the adaptive cancellation system.

FIG. 4 illustrates a block diagram of an exemplary embodiment of the adaptive cancellation system 320 shown in the transceiver of FIG. 3. Aspects of FIG. 4 are similar to FIG. 3 and hence, identical elements are referenced with identical reference numerals. The aspects of the adaptive canceller system 320 are now described in more detail. The input signal, to the cancellation system 320, on line 302 connects to a serial to parallel converter 408, which in turn connects to an overlap processing module 412. The signal on line 302 may comprise a signal to be transmitted to a remote station, such as station B from FIG. 2.

The serial to parallel converter 408 may comprise any device or system that converts the serial input on line 302 to two or more parallel lines. In one embodiment, the serial to parallel converter 408 comprises a de-multiplexer. Conversion to the parallel format aids in processing, such as conversion to the transform domain, of the signals while satisfying system time constraints.

The overlap processing module 412 comprises a combination of hardware, software, or both, configured to modify the signals that are subject to the transform. The overlap processing as described herein reduces distortion that would otherwise be generated by the transform process in the absence of such overlap processing. Overlap methods assist in achieving true linear convolution from the cyclic convolution of the fast Fourier transform. Any form of overlap processing may occur. Two such overlap methods comprise overlap-and-save (OAS) and overlap-and-add (OAA). In one embodiment, the overlap is a ⅝ overlap, although it is contemplated that 50% overlap or any other type of overlap processing may occur.

The overlap processing module 412 output feeds into the transform unit 416, which in one embodiment comprises a Fast Fourier Transform (FFT) unit. The mathematical operation of the FFT is understood by one of ordinary skill in the art, and hence the FFT unit is not discussed in detail herein. The output of the transform unit 416 comprises the input signal in the transform domain. With proper overlap methods, this can be realized in the frequency domain with computationally efficient Fast Fourier Transforms (FFT). It is contemplated that other methods of transforming the signal into an alternative domain are also available. These include, but are not limited to, Hadamard transform, Cosine transform, Walsh transform and Sine transform.

The output of the transform unit 416 connects to a processing module 424 and an adaptation block 420. The adaptation block 420 calculates one or more weighting variables W that are provided to the processing module 424. The processing module 424 may comprise any configuration of hardware, software, or both configured to generate a cancellation signal. In one embodiment, the processing module 424 comprises a processor or digital signal processor. In one embodiment, the processing module 424 comprises a multiplier configured to perform a multiplication operation in the transform domain that yields a result that could be arrived at by convolution of the received inputs in the time domain. The processing module 424 uses the weighting variables to scale the inputs provided to the processing module 424. It is contemplated that a parallel input is provided to the processing module 424; any number of weighting variables may also be provided to the processing module. In one embodiment, the processing occurs in the transform domain, and hence the processing module 424 yields a result that may be considered equivalent a convolution in the time domain. In this embodiment, multiplication in the frequency domain yields a result generally equivalent to convolution in the time domain.

In one embodiment, the weighting variables may comprise the variables $\{WV_0, WV_1, WV_2, WV_3, WV_4, \ldots, WV_X\}$. The output from the transform unit 416 may comprise $\{TD_0, TD_1, TD_2, TD_3, TD_4, \ldots, TD_X\}$, and the resulting output from the multipliers may comprise $\{WV_0*TD_0, WV_1*TD_1, WV_2*TD_2, WV_3*TD_3, WV_4*TD_4, \ldots WV_X*TD_X\}$. Thus, it can be seen that in one embodiment the multiplier occurs on a component-by-component basis.

This approach exploits the transform property that cyclic convolution in the time domain, although much different in operation and theory, yields a result that is mathematically equal to multiplication in the transform domain. Depending on the number of taps in the time domain filter, the complexity reduction of using the FFT, IFFT and frequency tap (vector) multipliers versus the time domain tap delay line can be as much as an order of magnitude. This is a significant advantage over systems not utilizing this method of operation. Moreover, the FFT and IFFT may be executed in the digital domain to increase efficiency. It is also contemplated that Fourier optics may be utilized to realize equivalent processing.

There are numerous techniques available for realizing the FFT and IFFT, such as but not limited to, Cooley-Tukey, Goertzel, Good-Thomas and Winograd. In one example embodiment, the Cooley-Tukey method is enabled. Moreover, it is contemplated that decimation-in-time or decimation-in-frequency may occur. In one embodiment, decimation-in-frequency occurs for the FFT while decimation-in-time occurs for the IFFT. In one example implementation, the parameterization of the FFT/IFFT processes 1024 real samples with a 512 point complex FFT/IFFT. In this implementation example, overlap and save processing may occur as described herein. By way of example, such an implementation example may process 640 new samples in each block. An equivalent processing structure based on prior art principles of processing in the time domain would require 385 filter taps. Hence, a significant advantage is realized. In addition, it is also contemplated that the method and apparatus described herein may be utilized to process not only signals that originate as real signals, but also signals that originate as complex signals. For example, the processing of complex signals in a wireless communications environment may occur based on the teachings contained herein.

The output of the multiplier 424 feeds into an inverse Fast Fourier Transform unit 430, which reverses the Fourier transform operation to thereby return the signal to the time domain. As an advantage of the method and apparatus described herein, the Fast Fourier Transform and inverse Fast Fourier Transform may be utilized to reduce computational complexity and speed of operation. The output of the inverse Fast Fourier Transform unit (ITU) 430 connects to an overlap processing module 434 which operates in the manner described above in conjunction with FFT module 412. The overlap processing module 434 provides the time domain signal to the parallel to serial converter 438. In one embodiment, the parallel to serial converter 438 comprises a multiplexer.

The serial output of the parallel to serial converter 438 feeds into the subtractor 338 to be subtracted from the output of the receiver 322. The processing of the adaptation block weighting variable W combined with multiplication in the frequency domain, or any transform domain, generates a signal capable of canceling the unwanted coupling that is combined with the FE signal.

The output of the subtractor 338 is provided to subsequent processing systems of the transceiver or communication system. The output of the subtractor 338 is also provided to a serial to parallel converter 440 that converts the input to a parallel signal and provides the parallel signal to an overlap processing module 444. The output of the overlap processing module 444 undergoes a Fourier transform operation in a Fast Fourier Transform unit 448 to convert the signal to the frequency domain. The output of the Fast Fourier Transform unit 448 is provided to the adaptation unit 420 as a feedback control signal. The adaptation unit 420 also receives the output from the transform unit 416.

Of particular importance is conversion of the input signal by the transform units 448, 416 to the transform domain, such as the frequency domain, so that cyclic convolution in the time domain yields a result that is mathematically equal to multiplication in the frequency domain. Domains other than the frequency domain may realize similar properties. Hence, the scope of the claims should not be limited to Fourier transforms or transforms that result in transformation to the frequency domain.

In one embodiment, the adaptation unit 420 executes least mean squared (LMS) adaptation to generate the weighting variables. The LMS adaptation may be constrained or unconstrained. In one embodiment, the unconstrained process is preferred as it eliminates an extra FFT/IFFT block pair and may perform more effectively. In another embodiment, the constrained process in preferred as it reduces the time required for the filter adaptation to converge. Either constrained or unconstrained may be utilized. Through adaptation, the desired weighting variables may be arrived at to cancel all or a portion of the unwanted crosstalk and echo. Thus, the signal path through devices 440, 444, 448, 420 operate as a feedback path of a servo control system. In one embodiment, the number of weighting variables is related to the size of the transform unit 416 output.

Operation of the example embodiment shown in FIG. 4 is similar to operation of the embodiment shown in FIG. 3, and hence a detailed discussion regarding operation is not repeated. In summary, through processing of the input signal on line 302, the adaptive cancellation system 320 generates a cancellation signal that may be used to cancel one or more of the crosstalk or echo on the received signal.

Figure 5:
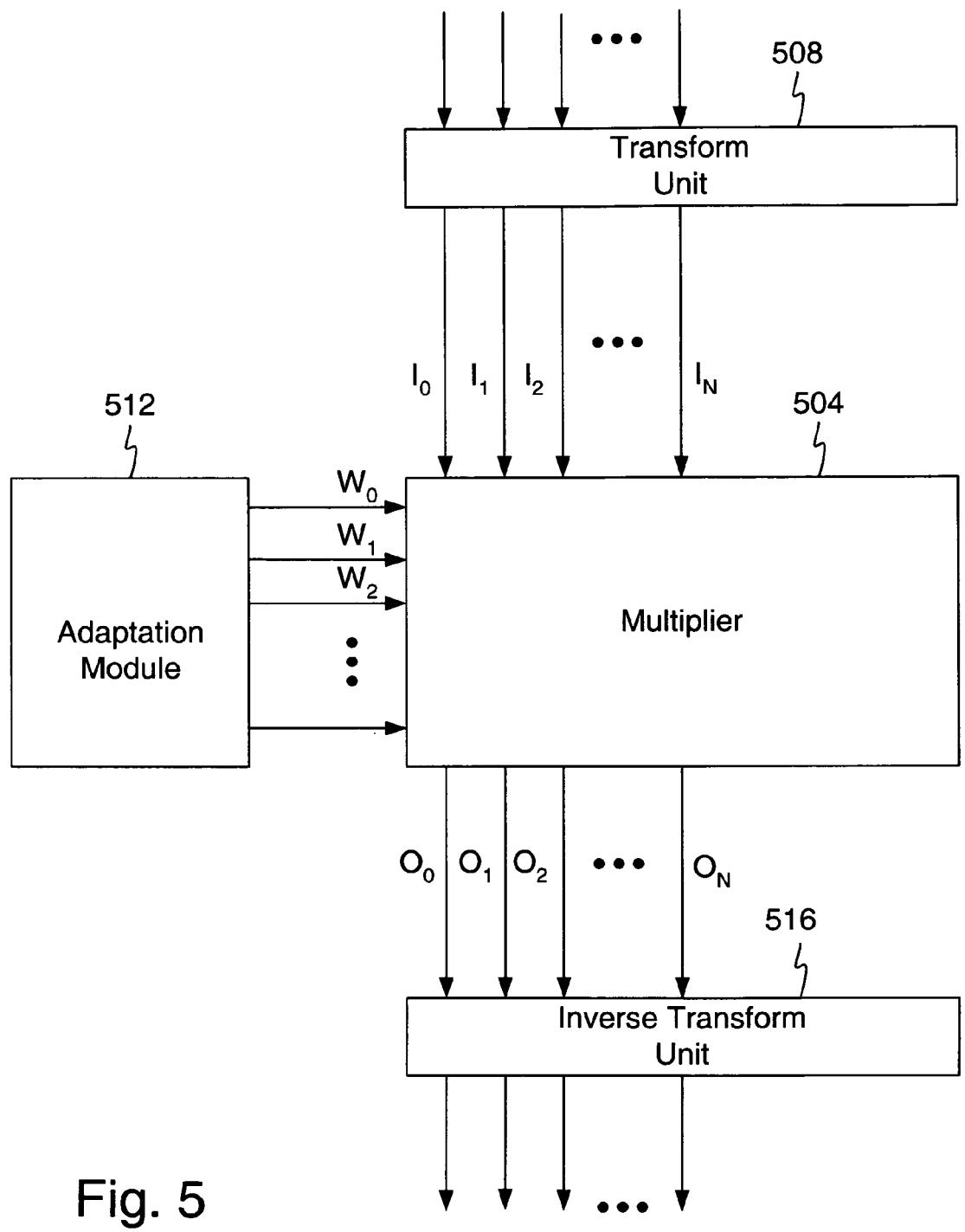
FIG. 5 illustrates a block diagram of the parallel line structure of the multiplier and its associated devices.

FIG. 5 illustrates a block diagram of the parallel line structure of the multiplier and its associated devices. As shown, the multiplier 504, such as multiplier 424 shown in FIG. 4, receives inputs $I_0$-$I_N$ from an FFT unit 508. The variable N may comprise any positive integer value, and hence the principles discussed herein are applicable with any number of parallel lines. The multiplier 504 also receives weighting variables $W_0$-$W_N$ from an adaptation module 512. The multiplier 504 has outputs $O_0$-$O_N$ that provide the result of the multiplication to the IFFT unit 516. The multiplier performs multiplication in the frequency domain, in this example embodiment, the domain resulting from the FFT operation. In one embodiment, this operation provides a result equal to cyclic convolution. It is contemplated that the multiplication of the weighting variables occurs on a component-by-component basis and that each weighting variable may comprise a different value. Thus, the multiplication may occur as $W_0 \times I_0$, $W_1 \times I_1$, up to the value N. In addition, the multiplier may have a shared multiplier such that a single multiplier may be utilized for more than one line, or may possess up to N number of different multipliers.

As an advantage to the method and apparatus disclosed in FIGS. 3, 4, and 5, a reduction in complexity is realized by multiplication in a frequency domain, such as the transform domain obtain from a Fourier transform. In systems of the prior art, a multi-tap, time-domain filter may have been required. However, utilizing processing in the transform domain one or more multiplication operations need only be performed. This may realize a 10-fold advantage in terms of complexity.

Figure 6:
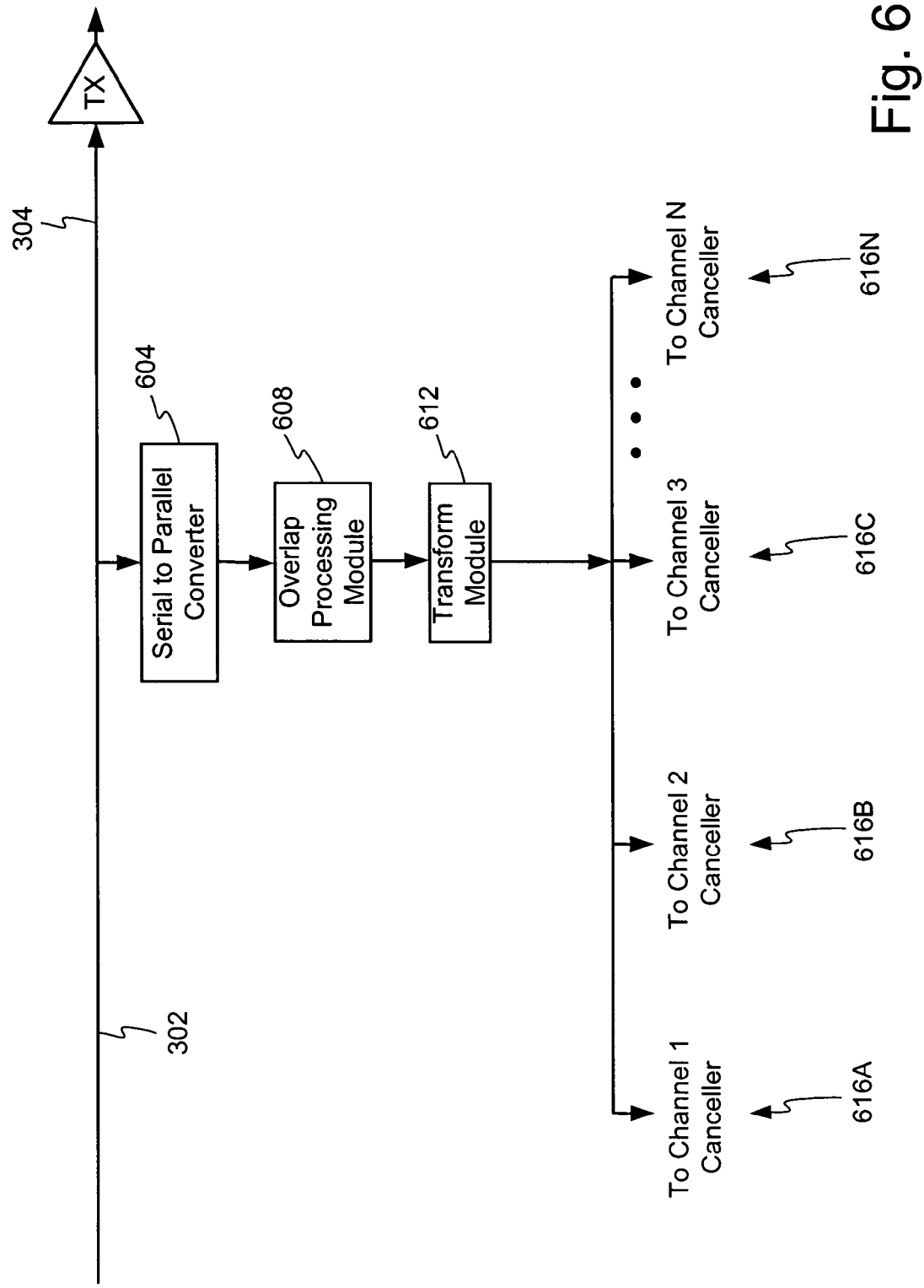
FIG. 6 illustrates a block diagram of an example embodiment of the consolidated transmit side processing system in a multi-channel environment.

In addition to the reduction in complexity, space requirements, and computational demands, the principles described above may be applied to multi-channel configurations. In addition, by exploiting the properties of the transform domain, additional benefits may be realized. FIG. 6 illustrates a block diagram of an embodiment of the consolidated transmit side processing system in a multi-channel environment. This embodiment builds on this complexity savings by exploiting the multiple channel environment to realize a major reduction in complexity and size. In general, a transmit signal is being used as a reference into several cancellers to eventually generate transform outputs for each of the channels into which it is disturbing. The transform outputs are scaled by weighting variables to generate cancellation signals to cancel the echo or crosstalk that is received at a particular transceiver. Thus, the first transceiver for channel 1 would generate a transform output for each receiver associated with channels 1 through 4. Likewise, each of the other transmitters in a multi-transceiver communication system would likewise generate four transform outputs. These principles may be applied to communication systems having any number of channels, and it can be seen that using prior art cancellation systems, the implementation complexity is overwhelming.

In a direct realization of the embodiment shown in FIG. 4, a multi-channel system would require N FFT units, i.e., one FFT unit for each of N channels. N may comprise any positive integer. In such an embodiment, the same signal would be provided to the input of each FFT. But, since the input to each FFT is the same, it follows that the output of each FFT is the same. Thus, in one embodiment of the invention, a consolidation is made such that only one FFT unit is utilized and its output is fanned out to N cancellation systems. Such an embodiment is shown in FIG. 6. With regard to the level of complexity and size reduction, in the embodiment with 4 transmitters, the total number of FFT units would be reduced from 16 to 4, a substantial 75% savings. This substantial reduction in size and complexity is in addition to the benefits gained from use of multiplication in the frequency domain instead of convolution in the time domain.

Turning now to FIG. 6, the input 302 to the first transceiver of a multi-transceiver communication system connects to the transmitter 304 and to a serial to parallel converter 604. The output of the serial to parallel converter 604 connects to an overlap processing module 608, which in turn has an output that feeds into an FFT unit 612. These devices and their operation are discussed above and hence, are not discussed again.

The output of the FFT unit 612 may be fanned using connectors 616A-616N to a cancellation system for a first channel through an $N^{th}$ channel. This reduces the total number of serial to parallel converters 604, overlap processing modules 608, and FFT units 612 by consolidating the processing apparatus and distributing the resulting signal. It provides a reduction in hardware by a factor of the number of channels. Thus, for a four channel system, one-fourth as many transform domain processing systems are required where the domain transform processing system are defined as the serial to parallel converter 604, overlap processing module 608, and FFT unit 612.

Figure 7:
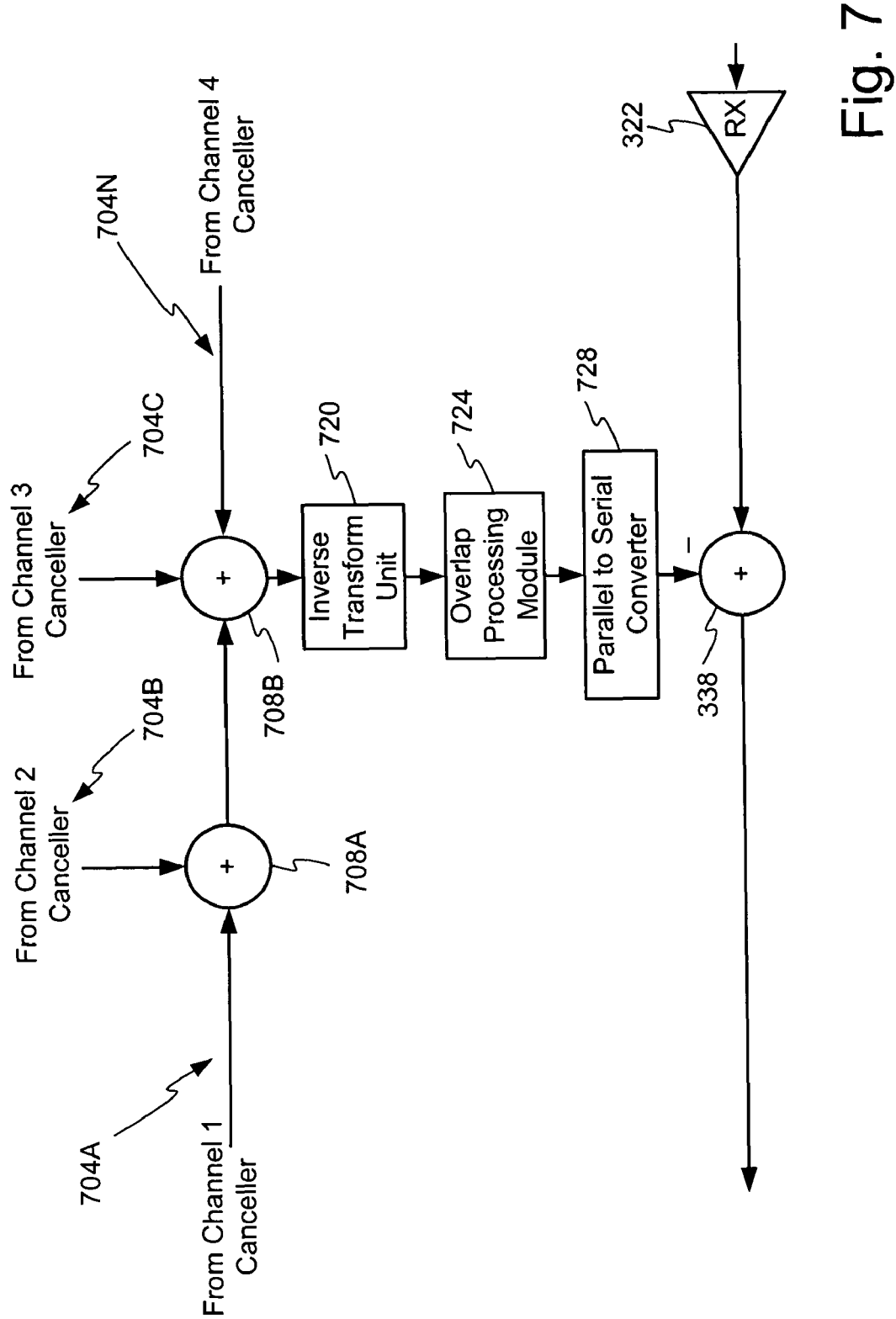
FIG. 7 illustrates a block diagram of an embodiment of a consolidated receiver side processing system in a multi-channel environment.

Similar advantages may be realized on the inverse transform side. FIG. 7 illustrates a block diagram of an embodiment of a consolidated receiver side processing system in a multi-channel environment. The embodiment of FIG. 7 is similar to FIG. 6 in that it realizes the advantages of a consolidated processing system with a distributed output. As shown, inputs 704A-704N arrive from cancellation processing systems associated with other channels. Thus, in a multi-channel environment, each receiver within each transceiver would include such hardware to cancel the unwanted echo and crosstalk.

The inputs 704A-704N connect to one or more adders, such adders 708A, 708B. An alternative embodiment may be configured to use three 2 input adders as opposed to one 2 input adder 708A and one three input adder 708B. The adders 708A, 708B combine the signals and provide the summation to an inverse transform unit 720. The output of the inverse transform unit 720 feeds into an overlap processing module 724, which in turn outputs the signal to a parallel to serial converter 728. The serial signal is provided to a subtractor 338 to be subtracted from the composite signal processed by the receiver 322.

As a result of the adders 708A, 708B, the processing of devices 720, 724, 728 may be consolidated through a single path as shown. A direct implementation without the consolidation would require an inverse transform unit 720 and its associated hardware for each channel. Due to linearity in the transform domain, the multiplicity of subtractors 338 can be moved to the input of the inverse transform unit 720 as shown. Thus, only one inverse transform unit 720 is needed. In the embodiment with 4 inputs from 4 receivers, the total number of inverse transform units 720 has been reduced by a factor of 4 (from 16 to 4), again a 75% savings.

Figure 8:
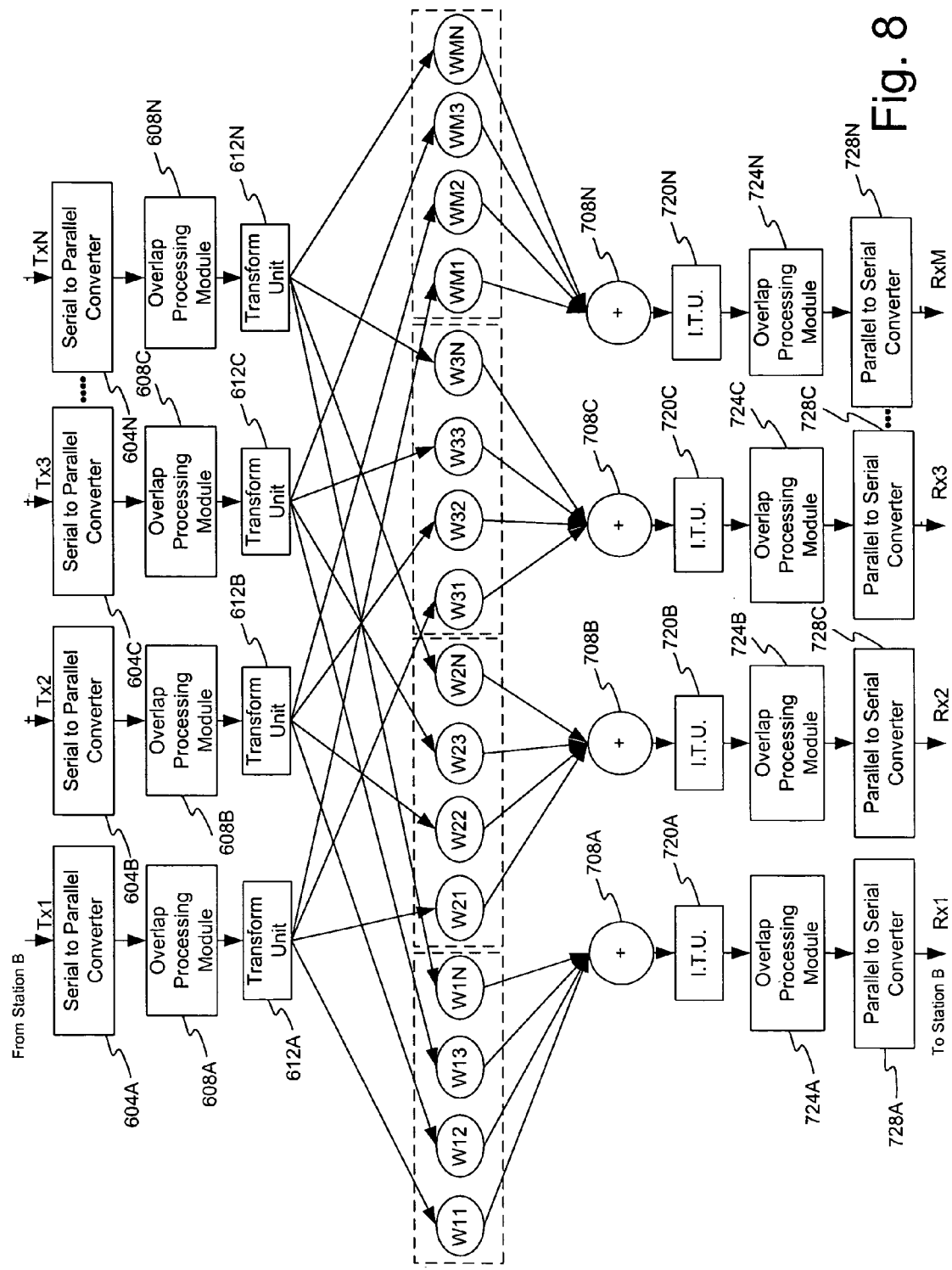
FIG. 8 illustrates a block diagram of an example embodiment of a consolidated cancellation system.

Combining the embodiments of FIG. 6 and FIG. 7 yields the embodiment of FIG. 8. FIG. 8 illustrates a block diagram of an example embodiment of a consolidated cancellation system. It is shown as having transmitters Tx1-TxN and having receivers Rx1-RxM. It is contemplated that the values of N and M may comprise any positive integer, and hence the principles may be extended to any number of transmitters and receivers. In this example, N×M frequency weights are used to complete the processing.

Turning now to FIG. 8, elements shown in FIG. 8 that are also shown in FIGS. 6 and 7, are labeled with identical reference numerals. Similarly, reference numerals that differ only by an alpha identifier are used to differentiate similar, but repetitive devices. Moreover, only the portions or aspects of FIG. 8 that were not discussed in prior figures are discussed. As shown, the output of each transform unit 612 connects as an input to one or more multipliers W. In the embodiment of FIG. 8, the output of transform unit 612A is distributed to multiple multipliers, namely multipliers W11, W21, W31, WM1. The output of the transform units 612A may be considered to be fanned out to multiplier blocks. Each multiplier block is comprised of multipliers W. In this embodiment, each multiplier block is comprised of one or more multipliers W and each block is associated with a channel.

The multiplier modules W perform multiplication of the outputs from the transform units 612 with one or more weighting variables that are provided to the multipliers W. The weighting variable input to the multiplier W is not shown in FIG. 8 due to limitations in space; however, it should be understood as being received from and an adaptation block (element 420, FIG. 4), switch or other device. The reference numeral of each multiplier W indicates the connection of the multiplier. For example, multiplier W13 is a multiplier that receives an input signal from a third transmitter and provides the multiplier output to the consolidated processing system associated with a first receiver.

The output of the multipliers W connect to summing junctions 708A-708N as shown. As can be seen in this embodiment, each summing junction 708 receives an input from a number of multipliers W. The number of inputs received at each summing junction may be based on the number of channels. Thus, summing junction 708A receives an input from multipliers W11, W12, W13, W1N. Hence, the inputs to the summing junction 708A, which corresponds to the first channel, are the coupling from each of the other channels, including the first channel. The summing junction 708A and the other elements 720A, 724A, 728A of this processing branch provide the combined and filtered signal to a subtractor (element 338, FIG. 4) to remove these coupled signals from the signal received on the first channel (element 310 of FIG. 4).

As can be seen, the output of the converter 728A is a cancellation signal that accounts for the coupling into the signal received on the first channel. This is true because the summing junction 708A receives processed cancellation signals from multipliers W11, W12, W13, W1N, which in turn had received and processed signals from each of the transmitters associated with the other channels in the communication system.

This pattern of processing also executes on the other branches of the multi-channel coupling cancellation system, as would be understood by one of ordinary skill in the art based on the previous discussion. As an advantage to this processing system as compared to the prior art or non-consolidated system, a reduction in complexity and processing is realized. For example, in a four-channel system, the reductions realized by the consolidated system shown in FIG. 8 equates to a reduction of 75% as compared to a non-consolidated system. This is in addition to the benefits gained by processing in the transform domain.

Figure 9:
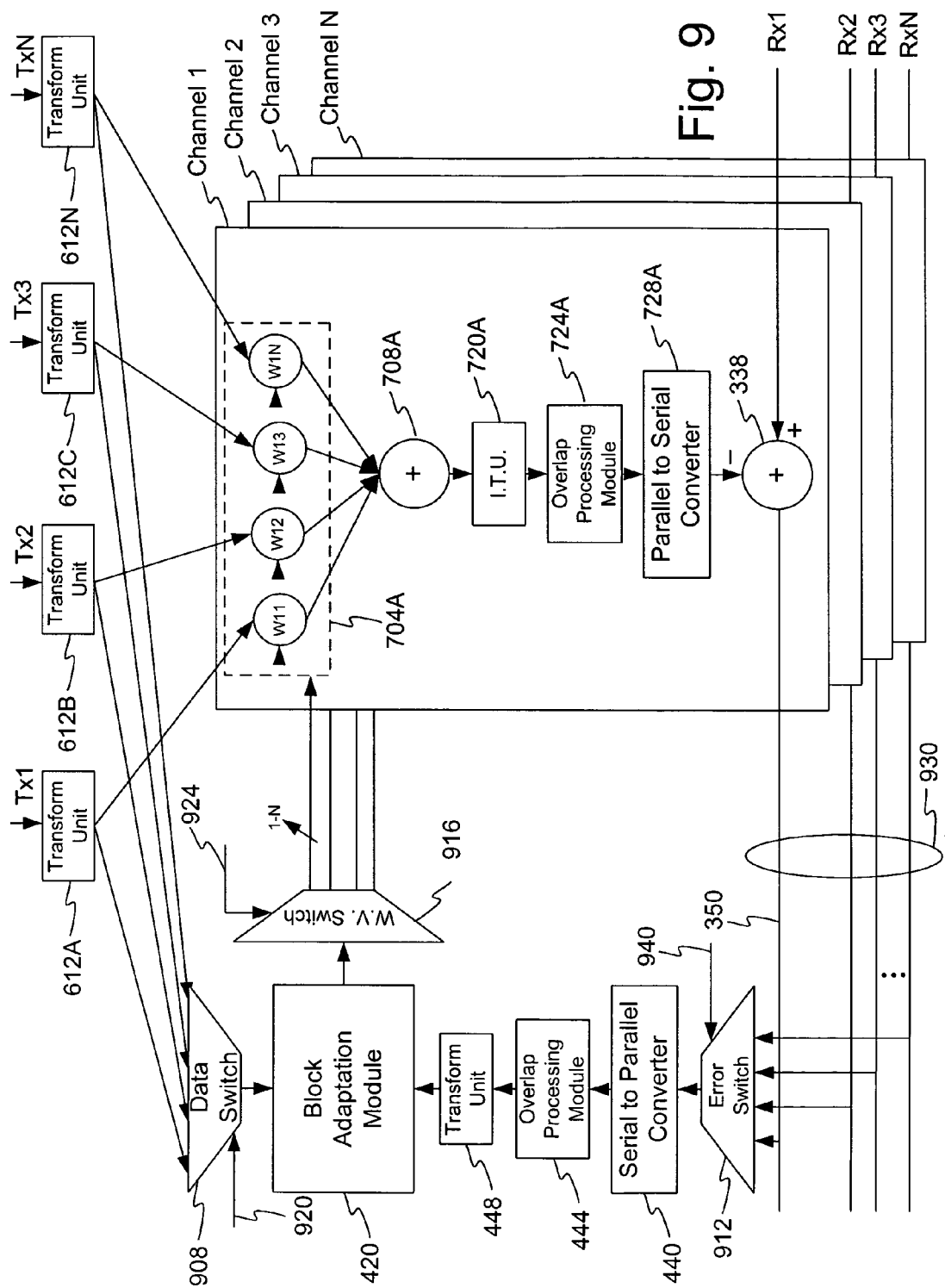
FIG. 9 illustrates a block diagram of an exemplary embodiment having distributed adaptive processing.

FIG. 9 illustrates a block diagram of an exemplary embodiment having distributed adaptive processing. In FIG. 9, elements that were described in the previous figures are referenced with identical reference numbers and are not discussed in detail again. As a result, the focus of FIG. 9 is the scheduled distribution of one or more weighting variables from the adaptation processing branch to the multipliers associated with the one or more channels. The weighting variables may be distributed to the various channels in any manner. In one embodiment, the scheduling occurs evenly in round robin fashion. In another embodiment, the round robin scheduling occurs in blocks. It is contemplated that the adaptation processing could also occur in real time for each channel, rather than shared as is shown.

In reference to FIG. 9, the transform units 612A-612N process the inputs from other channels into a transform domain, such as for example by use of a Fourier transform. The output of each transform unit 612A-612N is provided to the multiplier block 704 and to a data switch 908. It is contemplated that a multiplier block 704 be associated with each channel, in this embodiment channels 1-N. The data switch 908 selectively inputs the transform unit's outputs to the block adaptation module 420. A data switch control line 920 connects to the data switch 908 to thereby control operation of the data switch. The control signals to the switches may be generated by hardware, software, or a combination of both. In one embodiment, one or more hardware state machines generate one or more control signals used to control the switches described herein. It is contemplated that a micro controller may generate the control signals. Synchronization of data, such as by use of control signals to a switch 908, is understood by one of ordinary skill in the art and hence is not discussed in great detail herein.

The multiplier block 704 includes the multipliers W11, W12, W13, W1N. The output of the multipliers 704 feed into the processing elements subsequent to the multipliers 704 as shown for channel 1 and are processed in a manner described above in conjunction with FIG. 8. In a four channel embodiment, the adaptation module 420 may generate sixteen weighting variable sets such that each channel is provided a sub-set of four weighting variables, and each subset comprises sufficient weighting variables to modify the output from a transform unit 612 as desired.

The output of the subtractor 338 is provided as an input to an error switch 912. As part of the output of the subtractor 338 is also the FE signal or a signal generally similar to the FE signal. The error switch 912 provides one of the error input signals from lines 930 to the serial to parallel converter 440. In this embodiment, the feedback signal is considered an error signal and is used for purposes of adaptation. A control line 940 connects to the error switch 912 to control which input signal from lines 930 is provided to the serial to parallel converter 440. Processing occurs through elements 444, 448, and 420 as described above.

The block adaptation unit 420 generates the weighting variables that are provided to the weighting variable switch 916, which is in turn controlled by a control signal on a control input 924. The weighting variable switch 916 has outputs that connect to processing apparatus for each channel. As shown for channel 1, the switch 916 provides the weighting variables to the multipliers in the multiplier block 704 which would receive the weighting variables. It is contemplated that each line between the weighting switch 916 and the multiplier block 704 comprises numerous parallel lines. Thus, for the first channel, weighting variables are provided to multiplier W11, W12, W13 and so on up to multiplier W1N, wherein N is any positive integer. These are the weighting variables that the multipliers W receive and process to generate the cancellation signals to remove coupling on channel 1. As discussed above, these multipliers utilize the weighting variables during the processing to modify the outgoing signals that have been converted to the transform domain to thereby arrive at the proper cancellation signal.

Although the connection between the weighting switch 916 and each of the multiplier blocks 704A is shown as a single line, it should be understood that each connection may comprise a multi-conductor parallel line. In the specific example of the connection between switch 916 and the multiplier block 704A, there comprises a multi-path connection for each multiplier W. Likewise, numerous connecting lines between elements shown in FIG. 9 and other figures discussed herein may comprise one or more multi-path parallel conductors. For example, the input to the parallel to serial converter 728A is a parallel data path while the output of the parallel to serial converter is a serial data path.

It should be understood that for purposes of understanding, only the connections associated with channel 1 are shown. It is contemplated that connections from each transform unit 612 would have outputs which fan out to each of the other multiplier blocks 704 associated with the other channels. Likewise, an output from each of the transform units 612 would also fan out to the data switch 908 as shown for use by the block adaptation module 420.

In operation, generation of weighting variables by the block adaptation module 420 is shared by multiple channels. This has the effect of reducing complexity, power consumption, and size requirements of an implementation. To achieve these benefits, the output of the transform units 612 is selectively switched to the block adaptation module 420, as is the output of the subtractor 338 via error signal switch 912. The block adaptation module 420 performs processing on the transform unit outputs and the error signal to generate the weighting variables. The weighting variable switch 916 selectively switches the weighting variables to the multipliers W associated with the appropriate channel at the appropriate time in response to the control signal on control lines 920, 924 and 940.

It is anticipated that the rate of change in channel conditions is sufficiently slow to allow for a shared adaptation processing. Thus, during a first time period, weighting variables for a first channel are calculated and provided to the multipliers. These weighting variables are utilized by the first channel multipliers until a subsequent update for the weighting variables associated with the first channel. During a second time period, weighting variables are calculated for use by the multipliers associated with the second channel and these weighting variables are used until the next update of the second channels weighting variables. This process continues in this manner for each of the channels.

It is contemplated that the update process may occur on a sequential basis or based on some other factor. For example, a random pattern may be adopted. In another embodiment, the error signal may be monitored and adaptation processing may be dedicated on a greater percentage basis to channels having a greater error signal or with high rates of change in the error signal. In this manner, a controller, processor, or other device may selectively allocate adaptation resources based on one or more factors. For example, if one channel is subject to coupling levels that change over time, then the weighting variables associated with that channel may be updated more often than the weighting variables associated with the other channels. Prior weighting values and history may be stored in a memory or register. A comparator, control logic, or processor may perform the comparison. It is further contemplated that if the number of channels is greater than that which may be serviced in a timely manner by a single adaptation system, then the cancellation system may comprise more than one shared adaptation system. For example, an eight channel communication system may utilize a first adaptation system for the first four channels and a second adaptation system for channels five through eight.

One advantage of the shared adaptation system is that the components and processing requirements of the adaptation system need not be duplicated for each channel, and as a result, reduced power consumption and complexity is realized.

Figure 10:
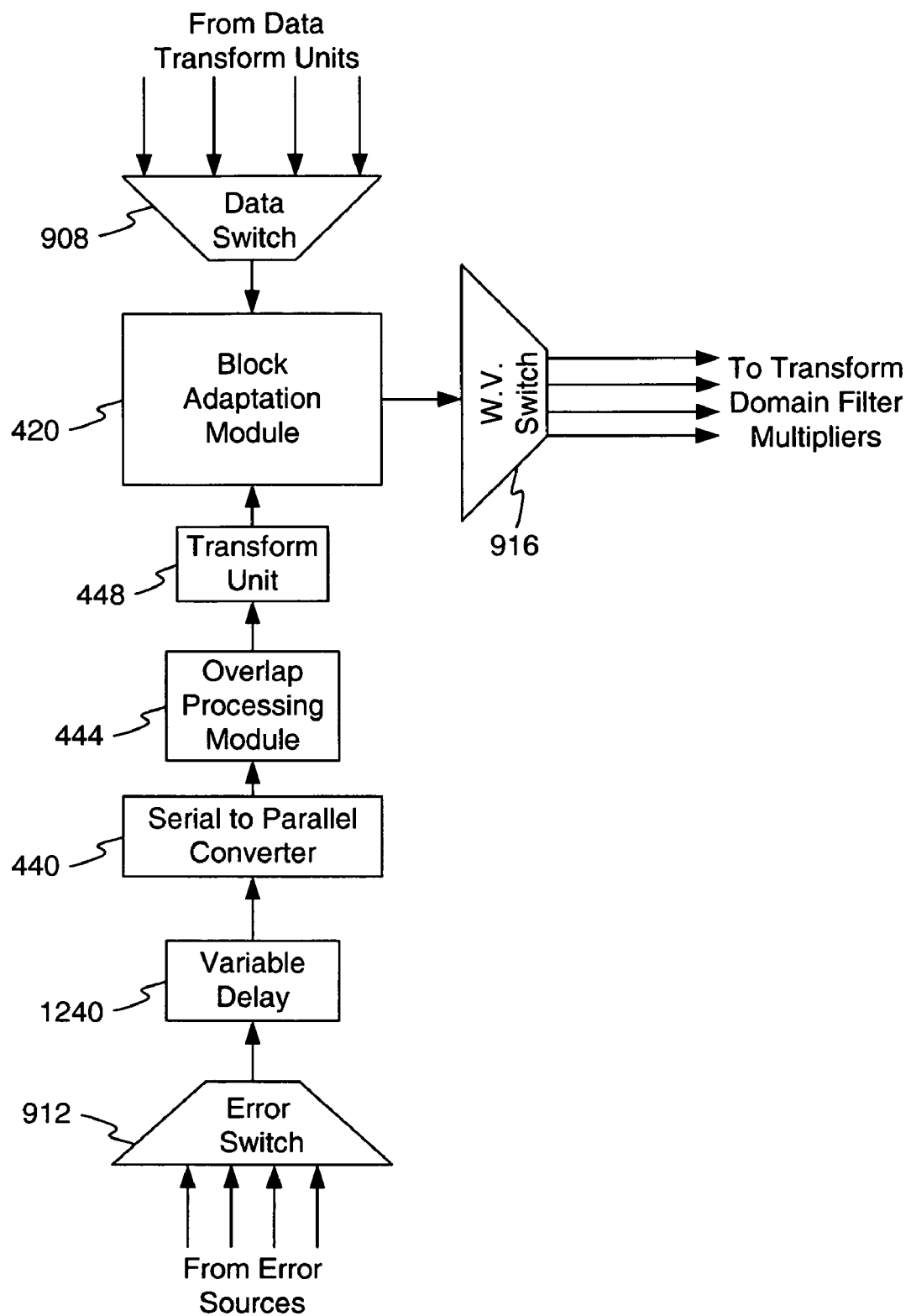
FIG. 10 illustrates a block diagram of an example embodiment of an adaptation processing system having a variable delay.

FIG. 10 illustrates a block diagram of an example embodiment of an adaptation processing system having a variable delay. FIG. 10 is generally similar to aspects of FIGS. 4 and 9 and, as a result, aspects of FIG. 10 that differ from FIGS. 4 and 9 are the focus of discussion. In addition to the components of FIGS. 4 and 9, the embodiment of FIG. 10 includes a delay 1240 configured to receive the output of the error switch 912. As shown, the delay 1240 may be variable and controlled to optionally introduce any level of delay into the error signal from the error switch 912 to thereby synchronize the output of the data switch 908 with the output of the transform unit 448. Any level or amount of delay or filtering may be implemented and the amount of delay or filtering may differ or be identical to the delay introduced other embodiments shown herein. Other aspects of the processing performed by the system of FIG. 10 occur as described herein.

Figure 11A:
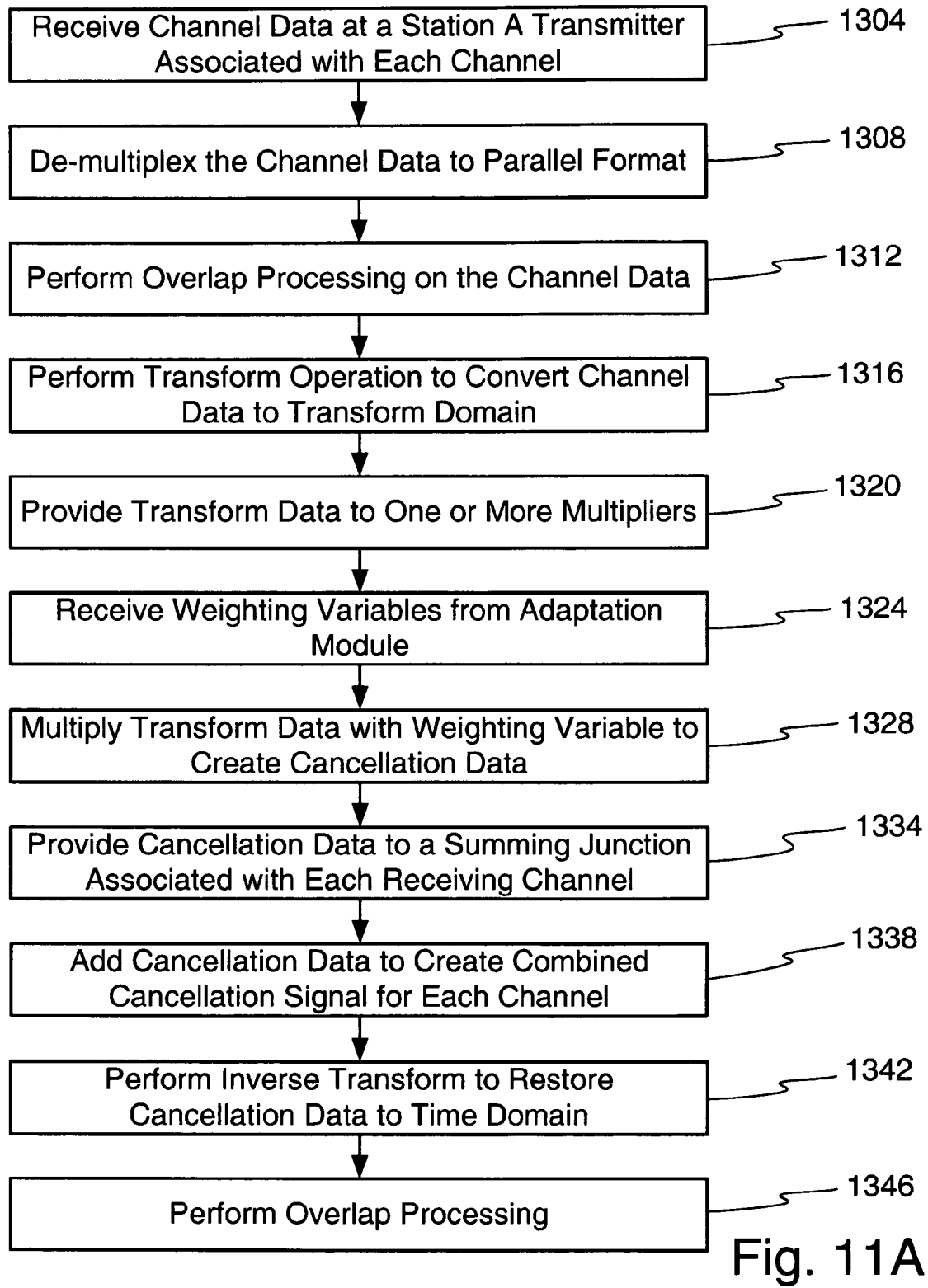
FIGS. 11A and 11B illustrate an operational block diagram of an example method of operation of one embodiment of the invention.
Figure 11B:
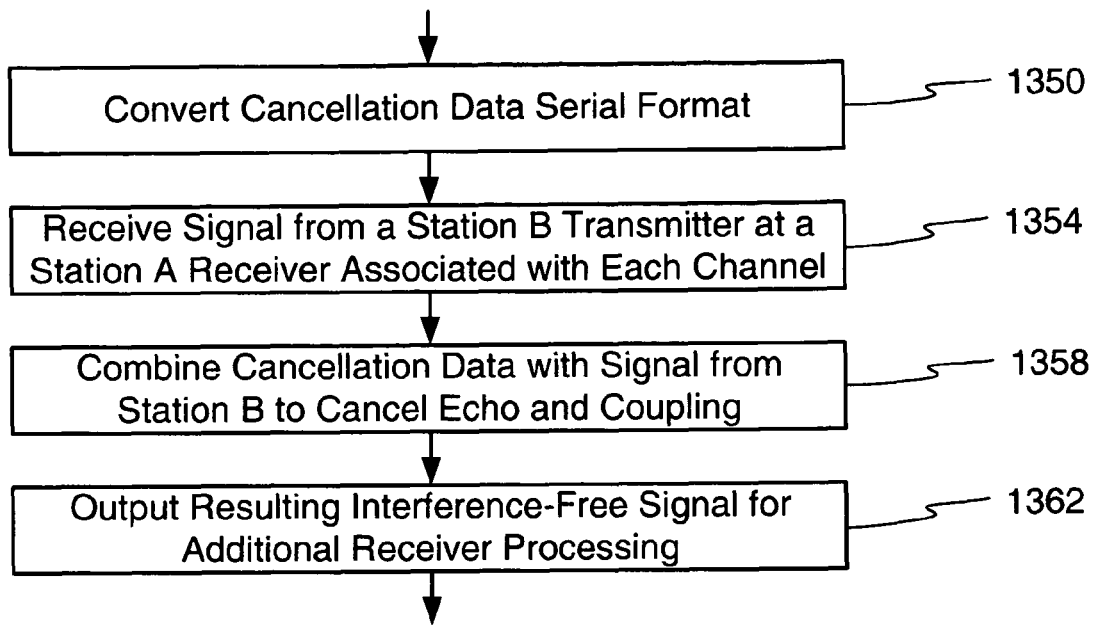

FIGS. 11A and 11B illustrate an operational block diagram of an example method of operation of one embodiment of the invention. In this example method, a reduced number of processing paths are utilized, such as is contemplated by FIG. 8, to reduce computational complexity. Moreover, a transform operation allows use of less complex processing methods. At a step 1304, the cancellation system receives channel data at a station A transmitter. It is contemplated that the cancellation system is part of a multi-channel communication system and that there may be a transmitter associated with each channel. The data may be received from a data source for transmission over a channel to a receiver at a station B. As part of transmission, the channel data signal may also be provided to a cancellation system for processing to generate cancellation signals. The cancellation signals are provided to the receivers at station A to cancel interference generated by the transmission of the channel data transmitted from station A to station B and which couples into the channel data, such as a far end signal, transmitted from station B to station A. The term channel data as used in FIG. 11 means data or signals that are received over a channel or are to be transmitted over a channel.

At a step 1308, the cancellation system de-multiplexes the channel data from a serial format to a parallel format. At a step 1312, the cancellation system performs overlap processing on the channel data. Overlap processing occurs to allow time-domain linear convolution to be performed by multiplication in the transform domain. Next, at a step 1316 the cancellation system performs a transform operation to convert the data to a transform domain to create transform data. The term transform domain is defined above. Once the channel data is in the transform domain, the operation progresses to a step 1320 and the transform data is output to one or more multipliers. Likewise, at a step 1324 the multipliers receive weighting multipliers from an adaptation module. The weighting multipliers comprise numeric values that are selected to modify the transform data, based on an error signal. Accordingly, at a step 1328 the multipliers multiply the transform data with the weighting variables to generate cancellation data. In one embodiment, the multiplication occurs on a data block by data block basis. It is contemplated that in one embodiment a weighting variable is multiplied with the value on each parallel conductor. Next, at a step 1334 the cancellation system provides the cancellation data to one or more summing junctions.

In one embodiment, the multipliers are associated into blocks and each block of multipliers is associated with a processing path that feeds into a particular summing junction and thereafter used for cancellation on the incoming signal on a particular channel. In such an embodiment, the output from each transform unit feeds into at least one multiplier in each multiplier block. In this embodiment, the output of each multiplier in each multiplier block feeds into the same summing junction. A hardware representation of this embodiment is shown in FIG. 8.

Next, at a step 1338 the cancellation system adds the cancellation data that was presented to each summing junction. This process of adding combines cancellation data from each transmit channel into a cancellation signal tailored to cancel the unwanted interference that will be present on each incoming signal, such as an incoming signal from a station B. Thus, a composite cancellation signal is created in each summing junction at step 1338. Thereafter, at a step 1342 the operation performs an inverse transform to reverse the effect of the transform operation and return the cancellation data to the time domain. As an advantage of the method and apparatus described herein, the linear properties of the transform domain allow the summation of the individual cancellation signals to be added to form a composite combined cancellation signal. As a result of these properties, processing may be consolidated and complexity reductions realized.

At a step 1346, overlap processing occurs, and at a step 1350 the cancellation system converts the cancellation data to a serial format. Thereafter, concurrently, or prior thereto, a station A receiver receives an incoming signal from a station B transmitter. The incoming signal, having previously passed through one of the channels connecting station A to station B, comprises interference coupling and the far-end signal. To remove the unwanted interference coupling, the operation at a step 1358 combines the cancellation data with the incoming signal. In one embodiment, the cancellation signal is created to be generally identical to the unwanted interference that coupled onto the incoming signal, and hence the cancellation signal is subtracted from the incoming signal. Thereafter, at step 1362 the operation outputs the resulting interference free signal from the receiver or the cancellation system for additional receiver based processing.

Figure 12:
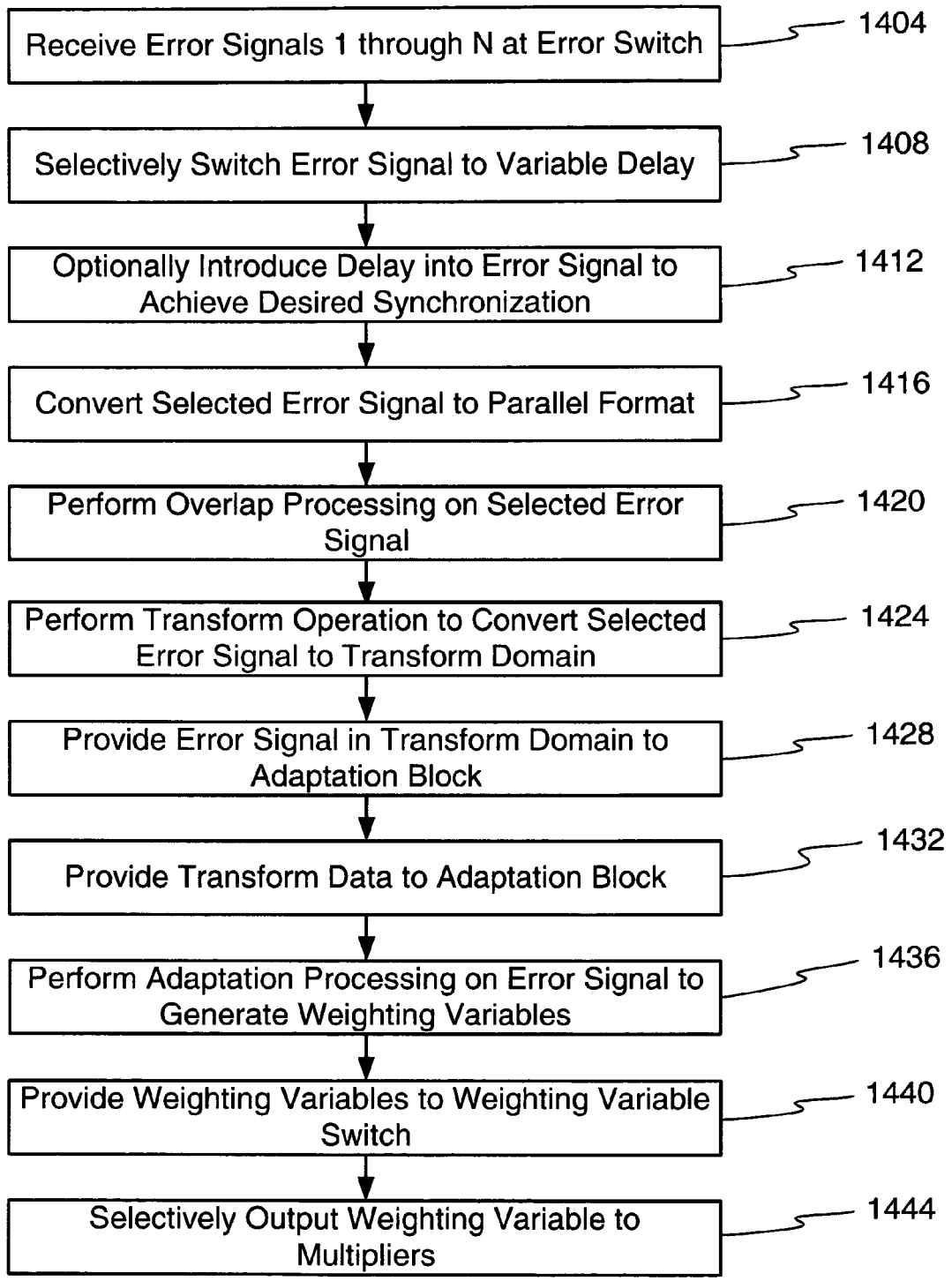
FIG. 12 illustrates an operational flow diagram of an example method of weighting variable generation and distributed processing as may be performed by an adaptation system.

FIG. 12 illustrates an operational flow diagram of an example method of weighting variable generation and distributed processing as may be performed by an adaptation system. This is but one possible method of generating weighting variables and selectively distributing the weighting variables to other aspects of the weighting system. At a step 1404, this exemplary method of operation receives error signals at an error switch. Any number of error signals may be received, such as error signals 1 through N, where N is any positive integer. In one embodiment, the error switch is provided with error signals from each channel. It is contemplated that in one embodiment an error signal comprises the incoming signal after having the cancellation signal subtracted from the incoming signal. In one embodiment, the error signal comprises a signal based on a decision device output or decision device error signal.

Next, at a step 1408 the adaptation system selectively switches one or more selected error signals to a variable delay. In one embodiment, only one error signal is provided to the delay. At the delay, and at a step 1412, the delay may optionally introduce any amount of delay into the error signal to achieve a desired level of synchronization with other aspects of the cancellation system. Any type of delay may be utilized. It is also contemplated that the delay may be introduced at any stage of processing or may be introduced within the cancellation system instead of or in addition to the adaptation system. Thereafter, at a step 1416 a serial to parallel converter converts the selected error signal to a parallel format. At a step 1420, the adaptation system performs overlap processing on the selected error signal and at a step 1424 error signal undergoes a transform operation to convert the selected error signal to the transform domain. It is contemplated that the transform units of the cancellation system and the transform units of the adaptation system manipulate an input into a domain that share the properties discussed above so that compatibility may be maintained. In other embodiments, simplified processing may occur other than a multiplication.

After the transform operation, the data is provided to an adaptation module. This occurs at a step 1428. At step 1432, the transform data, which comprises the channel data in the transform domain, is provided to the adaptation module. In one embodiment, the transform data is provided to the adaptation module via a data switch that operates in a similar manner to the error switch. It is contemplated that the switches of the adaptation system are synchronized such that during common time periods, processing occurs on data, such as error signals and channel data corresponding to a common channel. Thus, when the adaptation module is receiving an error signal associated with channel 1, it would also be receiving transform data associated with channel 1.

At a step 1436, the adaptation module processes the transformed error signal and the transform data to generate weighting variables. The processing generates weighting variables tailored to modify the transform data into cancellation data capable of canceling interference that has coupled onto the incoming signal. The adaptation module may perform any type processing to generate the weighting variables. In one embodiment, the least mean square algorithm is executed. In other embodiments, least squares type adaptation occurs.

After adaptation processing the adaptation module outputs one or more weighting variables to the weighting variable switch. This occurs at a step 1440. The weighting variable switch selectively outputs the weighting variables to the multipliers of the cancellation system. As discussed above, the adaptation system may be considered to be shared by the one or more channels of the multi-channel communication system. It is contemplated that the rate of change in the interference that couples onto a channel is sufficiently slow to allow for a shared adaptation system. At a step 1444, the weighting variable switch outputs the one or more weighting variables to the multipliers.

To overcome the drawbacks of the prior art, a method and apparatus for frequency domain cancellation is disclosed. FIG. 13 illustrates an exemplary prior art block structure upon which prime factor algorithm Fourier transform processing occurs. In this prior art structure, the incoming data was arranged into each cell 1508 along the each axis 1512, 1516, 1520. As one drawback to the prior art, the data which filled the block structure 1504 had to be arranged in a particular order. The process of ordering the data into the desired order for processing introduced latency into the operation. Once arranged, the data in the block structure 1504 was processed in a prior art manner, which although achieving the processing goals, also introduced additional latency due to the nature of the block structure. The use of a 'real adjust' process added further latency to the transform.

As discussed above, numerous solutions to reduce latency are available, but each suffer from other drawbacks. For example, one such proposed solution is to simply reduce the size of the block. While this proposed solution reduces latency, it undesirably increases power consumption due to the increased number of additions and multiplies that must occur for a set amount of data.

To overcome the drawbacks of the prior art, a combination of Good-Thomas indexing, Winograd small transforms and Cooley-Tukey approaches are utilized in novel combination. The implementation of the Cooley-Tukey transform may or may not be mixed radix. Although described below in a novel two-dimensional (2-D) it is contemplated that in other embodiments this processing arrangement may be applied to different dimensional structures.

In one embodiment, the data may be arranged into the structure shown in FIG. 14, which illustrates a conceptual two dimensional array. In FIG. 14, the structure 1604 comprises horizontal rows 1608 and vertical columns 1612. In this example embodiment, there are cells 1616 which each contain an item of data, such as a value or fixed point sample value. In this example embodiment there are $l_r$ horizontal cells in each row formed by $l_r$ columns. In addition, there are $l_w$ rows total, such that each column is formed from l cells. This creates $l_w \times l_r$ cells in this 2-D array. The array may be considered as length $l_w$ and the other dimension is $l_r$. The array 1604 shown is to aid in understanding and provide assistance in the discussion of the processing operations set forth herein, as such are used herein to achieve an output of the processing system. In other embodiments other size arrays may be utilized to suit the communication system.

It is contemplated that the two dimensional array may have any of the following configurations. These are provided for purposes of example only and the combinations are not limited to these combinations.

| Number of rows | Number of columns |
| --- | --- |
| 3 | 4 |
| 3 | 8 |
| 3 | 16 |
| 3 | 32 |
| 3 | 64 |
| 3 | 128 |
| 3 | 256 |
| 3 | 512 |
| 3 | 1024 |
| 5 | 4 |
| 5 | 8 |
| 5 | 16 |
| 5 | 32 |
| 5 | 64 |
| 5 | 128 |
| 5 | 256 |
| 5 | 512 |
| 5 | 1024 |
| c | 4 |
| 7 | 8 |
| 7 | 16 |
| 7 | 32 |
| 7 | 64 |
| 7 | 128 |
| 7 | 256 |
| 7 | 512 |
| 7 | 1024 |
| 9 | 4 |
| 9 | 8 |
| 9 | 16 |
| 9 | 32 |
| 9 | 64 |
| 9 | 128 |
| 9 | 256 |
| 9 | 512 |
| 9 | 1024 |
| 11 | 4 |
| 11 | 8 |
| 11 | 16 |
| 11 | 32 |
| 11 | 64 |
| 11 | 128 |
| 11 | 256 |
| 11 | 512 |
| 11 | 1024 |
| 13 | 4 |
| 13 | 8 |
| 13 | 16 |
| 13 | 32 |
| 13 | 64 |
| 13 | 128 |
| 13 | 256 |
| 13 | 512 |
| 13 | 1024 |

The transform length is defined by the number of elements in a 2-D array where one dimension is governed by the length $l_w$, of a small winograd transform and the other dimension is governed by the length, $l_r$, of a Cooley-Tukey (or other type of FFT) transform. Thus, the total length of the transform is $(l_w \times l_r)$. The values $l_w$ and $l_r$ are necessarily co-prime in order for Good-Thomas indexing to apply.

In one embodiment, the architecture of the algorithm in use is Good-Thomas ordering, followed by lw-point Winograd transforms on the columns, followed by lr-point Cooley-Tukey transforms on ceiling (lw/2) the rows. However, it is contemplated that in one configuration only Good-Thomas indexing, followed by some type of small lw-point fft (Winograd or Singleton), followed by some type of lr-point longer transform (Cooley-Tukey or Winograd or Rader or Bruun) on ceiling (lw/2) the rows may be utilized.

In one embodiment the 2-D array is ordered using Good-Thomas indexing. Good-Thomas indexing is described on pages 125-129, H, J. Nussbaumer, Fast Fourier Transform and Convolution Algorithms, Second Edition, 1982. Good-Thomas indexing is defined for a DFT of size N, where N is the product of two mutually prime factors $N_1$ and $N_2$. In this particular embodiment $N_1=l_w$ and $N_2=l_r$.

This ordering may occur within one or more buffers. The indexing allows the N point DFT operation to be calculated from a combination of $l_w$ and $l_r$ point transforms without the use of twiddle factors between these operations. Twiddle factors may be used at other stages of the processing i.e. as part of the $l_w$ and $l_r$ point transforms. Twiddle factors comprise multiplicands which vary depending on which frequency index input is being processed. By avoiding the use of twiddle factors latency and power consumption are reduced.

After ordering of the data within the 2-D array, the data is taken from the array and processed by a number of small Winograd transforms. In this particular embodiment the number of physical transform engines is fixed by the radix of the Cooley-Tukey transforms. By way of example, for a radix-2 Cooley-Tukey FFT, 2 physical Winograd transforms would be used.

The processing on the values is performed by first processing the columns of aligned data in the columns 1612. As set forth above, in this embodiment, there are $l_r$ data elements in each of the $l_w$ rows and therefore, there are $l_r$ columns of data. These data elements in each of the $l_r$ columns are processed using a small Winograd transform along this axis. In one embodiment, there are a total of p Winograd processors, where p is the number of data elements concurrently processed in the $l_r$ point FFT; in this embodiment the $l_r$ point FFT is calculated using an $l_r$ point Cooley-Tukey transform. At time t the kth Winograd processor takes its input from the $t+(k.N/p)$ th column where $k=0 \ldots p$, $t=0 \ldots (l_r/p)-1$. For example, for a radix-2 4 point Cooley-Tukey transform, with $l_w=3$, $l_r=16$, two 3-point Winograd processors would be implemented, with the first processing data from columns 0 . . . 7, the second processing data from columns 8 . . . 15.

In this configuration, the input to the Winograd processors is real. It is well known that for a real signal at the input a Fourier transform returns a conjugate-symmetric signal (this is described, for example, in section 1.6 Some Symmetry Properties of the Fourier Transform, Digital Signal Processing, by Alan V. Oppenheimer and Ronald W. Schafer, 1975, pages 24-26). Of the $l_w$ outputs, the first (dc term) is entirely real. If the value $l_w$ is even then the $l_w/2$ th term is also real. The other outputs between the dc term and the $l_w/2$th output are complex conjugates of the terms on the other side of the $l_w/2$th term. Since the outputs are symmetric only half, or a little over half, of them need to be computed. This reduces the power required in this calculation. Furthermore the number of calculations required at subsequent stages is also reduced, resulting in further power reduction, without any latency increase.

One benefit to this particular combination of processing compared to the prime factor algorithm is that it eliminates the need for matrix reordering between processing steps. This is a significant advantage because reordering the matrix between processing steps consumes time thereby increasing latency and requires complex and power consuming memory buffers, control logic and memory structures.

In addition, software based reordering, which may avoid the complex and power consuming control logic and memory structures does not meet the required time constraints.

Processing on the rows of data occurs using an $l_r$ point FFT. In this example embodiment the value $l_r$ is defined as a value $l_r=2^n$. In other embodiments, $l_r$ may be any value. The $l_r$ point FFT can be implemented by any method including but not limited to Cooley-Tukey, Prime Factor Algorithm, Short Winograd transform, Bluestein's algorithm, Bruun's algorithm. The structure described above allows the transform to be efficiently pipelined at every stage. This maximizes the throughput of the processing engine, and thereby reduces the latency of the canceller.

Use of the Cooley-Tukey $l_r$ point FFT on the rows of data has the advantage of using an efficient structure for digital implementation. In addition, due to the data in the array being real, and not complex, after processing, the data in all rows k below ceil[$l_w/2$] are redundant complex conjugates. The data is real and not complex because the block input data was real since this is a baseband system. For odd values of $l_w$, the output of row 0 is real and all other rows contain complex data. For even values of $l_w$, the outputs of row 0 and row $l_w/2$ are real and all other rows contain complex data. As a result, there is no need to perform the associated processing operation for the rows below $l_w/2$ and there is no need to calculate the values in these rows. This reduces the processing requirements, which in turn reduces power consumption and latency by reducing the number of multiplies. Consequently, for the exemplary array shown in FIG. 14, there are only ceiling [$l_w/2$] $l_r$-point FFTs to compute. In one embodiment these computations are parallelized to reduce latency. An advantage of this transform is that its structure gives a simple parallelization that does not require further reordering. This reduces power and latency.

As an advantage over the prior art, use of the combined Winograd—Good Thomas—Cooley-Tukey transform provides the advantage of reduced latency. Latency is reduced since the real adjust operation is not required. In addition and as set forth above, the size of the array and the unique processing that occurs on the data therein also provide the advantages listed above.

Figure 15:
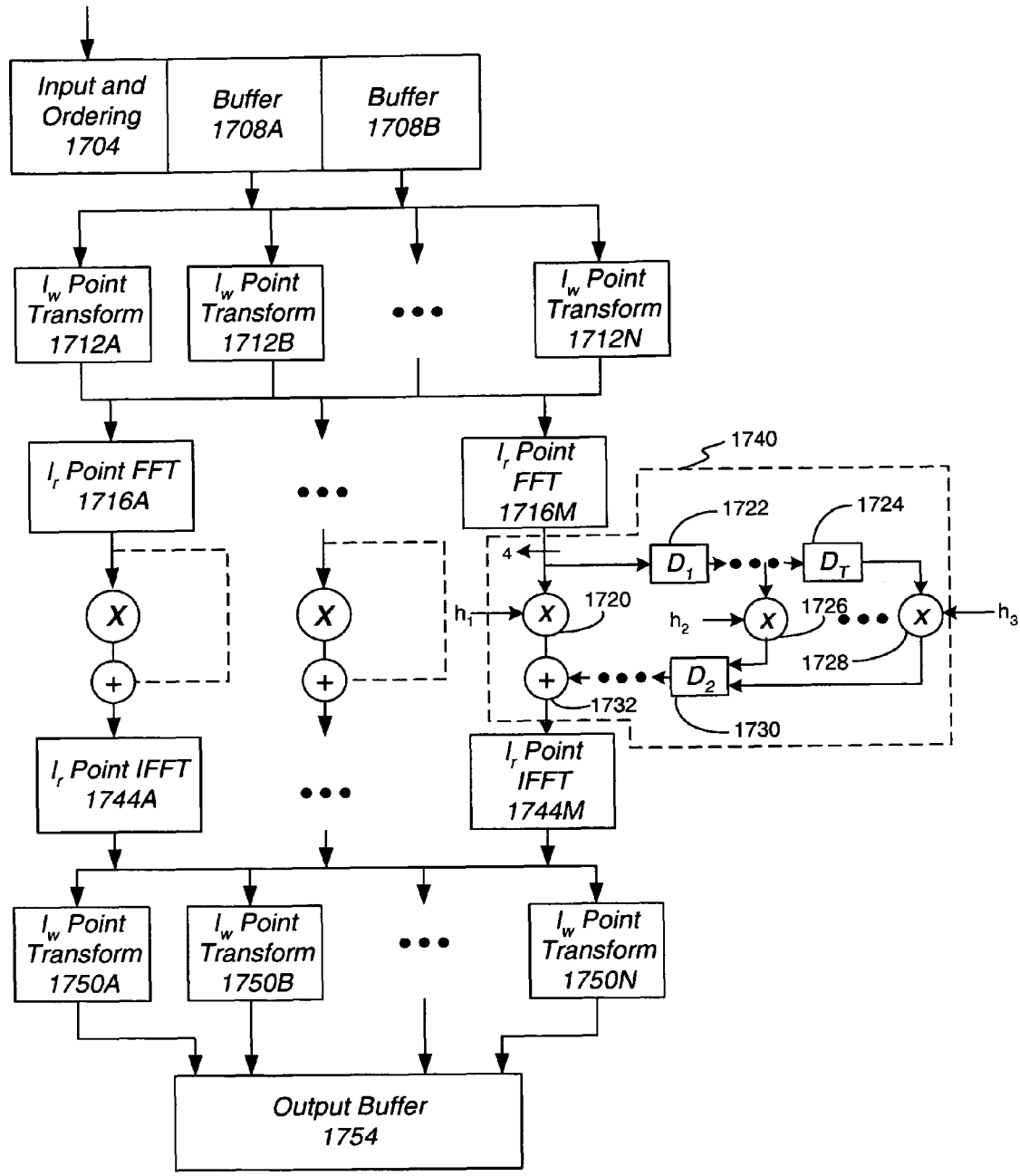
FIG. 15 illustrates an example block diagram of an example embodiment of the transform system described herein.

FIG. 15 illustrates an example block diagram of an example embodiment of the transform system described herein. This is but one possible example embodiment and as such, it is contemplated that after reading this disclosure one of ordinary skill in the art may contemplated other embodiments, and these other embodiment will not depart from the scope of the claims that follow. In this example embodiment, data for processing is presented to an input and ordering module 1704. The input and ordering module 1704 processes the data for use by the canceller to generate the data points which are processed by subsequent stages. The data output from the input and ordering module 1704 comprises that data that is placed in or forms the conceptual array structure shown in FIG. 14. The input and ordering module 1704 may comprise any combination of hardware, software, or both. In one embodiment, the sampler 1704 comprises a digital logic, look up tables and memory buffers.

The output of the input and ordering module 1704 is selectively provided to buffers 1708A, 1708B. The buffer may comprise any type storage device or memory including but not limited to registers or RAM. The data from sampling is selectively placed within the buffers 1708A, 1708B until the buffers are full, at which time subsequent processing may occur. In other embodiments a single buffer, or two or more buffers may be utilized.

The structure of the buffers 1708A, 1708B may be conceptually considered as the array of FIG. 14 or the data may be pulled from the buffers as if in the arrangement of an array. In this embodiment, the data is selectively placed in or retrieved from the buffers based on Good-Thomas indexing such that the ordering is in a preferred or optimized order for the subsequent processing. In this example embodiment, the data is arranged to benefit from the Good-Thomas re-ordering (also referred to herein as prime factor algorithm). In other embodiments, different data ordering schemes or algorithms may be utilized.

The outputs of the buffers 1708A, 1708B feed into the transform units 1712A, 1712B, through 1712N (collectively 1712), where N is any whole number. In this embodiment, the transforms 1712 operate in parallel. In this example embodiment there are r Winograd transform engines that operate in parallel, where r is the radix used to implement the $l_r$ point Cooley-Tukey transform but it is contemplated that in other embodiments any number of transform unit(s) may be utilized. In this embodiment, the transforms comprise $l_w$ point Wingrad transforms on the data presented to the transform units 1712 from the buffers 1708A, 1708B. In this embodiment, $l_w$ point transforms are used since the array of FIG. 14 is selected with $l_w$ point columns. The transform units 1712 may comprise hardware, software, or both, depending on the particular application. In this embodiment, the transforms comprised hardware or hardwired devices and logic to achieve Winograd processing.

After the data is processed by the transform units 1712, the resulting processed data, in this embodiment, goes directly into the $l_r$ point FFT units 1716A, through, 1716M, where M is any whole number. In this embodiment, there are ceiling ($l_w/2$) FFT units 1716 which processes the data across the first ceiling ($l_w/2$) rows of the conceptual array shown in FIG. 14. Because there are $l_r$ columns, each of the FFT units 1716 are $l_r$ point units. Each FFT unit 1716 processes the data in parallel as shown. In this embodiment, the FFT units 1716 are configured to perform a radix r FFT operation. In this embodiment the value r is set at 4, but in other embodiment the value of r may be any value. As discussed above, due to the use of real input signals, the last floor ($l_w/2$) rows are complex conjugates and do not need to be calculated. The function y=floor [x] returns the largest integer y which is equal to or smaller than the value x. As a result, only ceiling ($l_w/2$) FFT units FFT units 1716 are required and shown in this embodiment. In other embodiments, other transforms may be utilized and any number of FFT units 1716 may be utilized to suit the latency, power, and array size specification.

The output of the FFT units 1716 is output to one or more multipliers 1720. In one embodiment, multiple multipliers are provided to achieve parallel processing of the data. In such an embodiment, the output of the multiplier 1720 would connect directly to the IFFT 1744 which is discussed below in greater detail.

It is also contemplated that in an alternative embodiment, a reduced number of multipliers 1720 may be utilized and delays, and summing junctions as shown may be incorporated into the design as shown in element 1740. In FIG. 15, only the right most data path is shown due to space limitation, but it is contemplated that in this alternative embodiment the structure 1740 would be duplicated for each of the other two data paths. In this configuration, the output from the FFT unit 1716 is provided to a multiplier 1720 and a delay D1 1722. The delay D1 1722 delays the received data and has outputs which connect to a delay DT 1724 and a multiplier 1726 as shown. The output of the delay DT 1724 connects to a multiplier 1728. The outputs of the multipliers 1726, 1728 connect to a delay D2 1730. The output of the delay 1730 connects to summing junction 1732. Each of the multipliers 1720, 1726, 1728 receives a respective coefficient input $h_1$, $h_2$, $h_3$ as shown. It should be noted that the multipliers 1726, 1728 are not physically present, but are illustrated for purposes of understanding. The multipliers 1720 is used multiple times and at different times, different coefficient values h1, h2, h3, . . . , $h_n$ are used.

In operation, if this alternative embodiment is implemented, the multipliers and delays of element 1740 (shown as the elements in the dash line) forms the NEXT and Echo cancellation signal and the multipliers h1, h2, h3 are selected to generate the desired cancellation value. In this configuration, the multiplier's operation time is less than a full block time. As such, multiplies in the multipliers 1726, 1728 will be used more than once during a cycle. Stated another way, the multiplier does not take a full cycle and in fact are busy for less than ½ the cycle. As such, when a multiplier is not in use, the system prepares the data for the second and third blocks using the multipliers during the next cycle. The same multiplier is used multiple times during a cycle and added back into the data frame. As such, the system reduces space requirements by re-using the multipliers. In this configuration the technology or process is small form factor, so a significant portion of power consumption is due to leakage current. Thus, even if not performing active processing, an element consumes power. As a result, redundant circuits which are only occasionally used consume power even when not in use and are undesirable. FIGS. 4 and 5 above, and the associated text, discuss the purpose and function of the multipliers in more detail.

The output of the multiplier 1720 is provided to the inverse fast Fourier transform (IFFT) units 1744A through 1744M as shown. The IFFT units 1744 perform the inverse transform as is performed by the transform units 1716. In this embodiment, the inverse transform is an inverse $l_r$ point radix r IFFT. The variable r may comprise any whole number. The outputs of the IFFT units 1744 connect to the transforms 1750A, 1750B through, 1750N. The transforms 1750 are the inverse of the transforms 1712 discussed above.

After processing by the IFFT unit 1744 and the transform unit 1750, the data is fed into an output buffer 1754 for processing by subsequent stages of the system. Reverse ordering of the data may be performed to generate an output that is time oriented or structurally oriented after processing in the frequency domain. In one embodiment a similar 2-D array is recreated and re-ordering is performed as the transform output becomes available. The processed data is retrieved from the array in the proper sequence for cancellation in the time domain. Re-ordering does not introduce additional latency because the buffers are awaiting data and can perform the reordering while waiting for the blocks to accumulate. The output buffer may also utilize Good-Thomas indexing.

Figure 16:
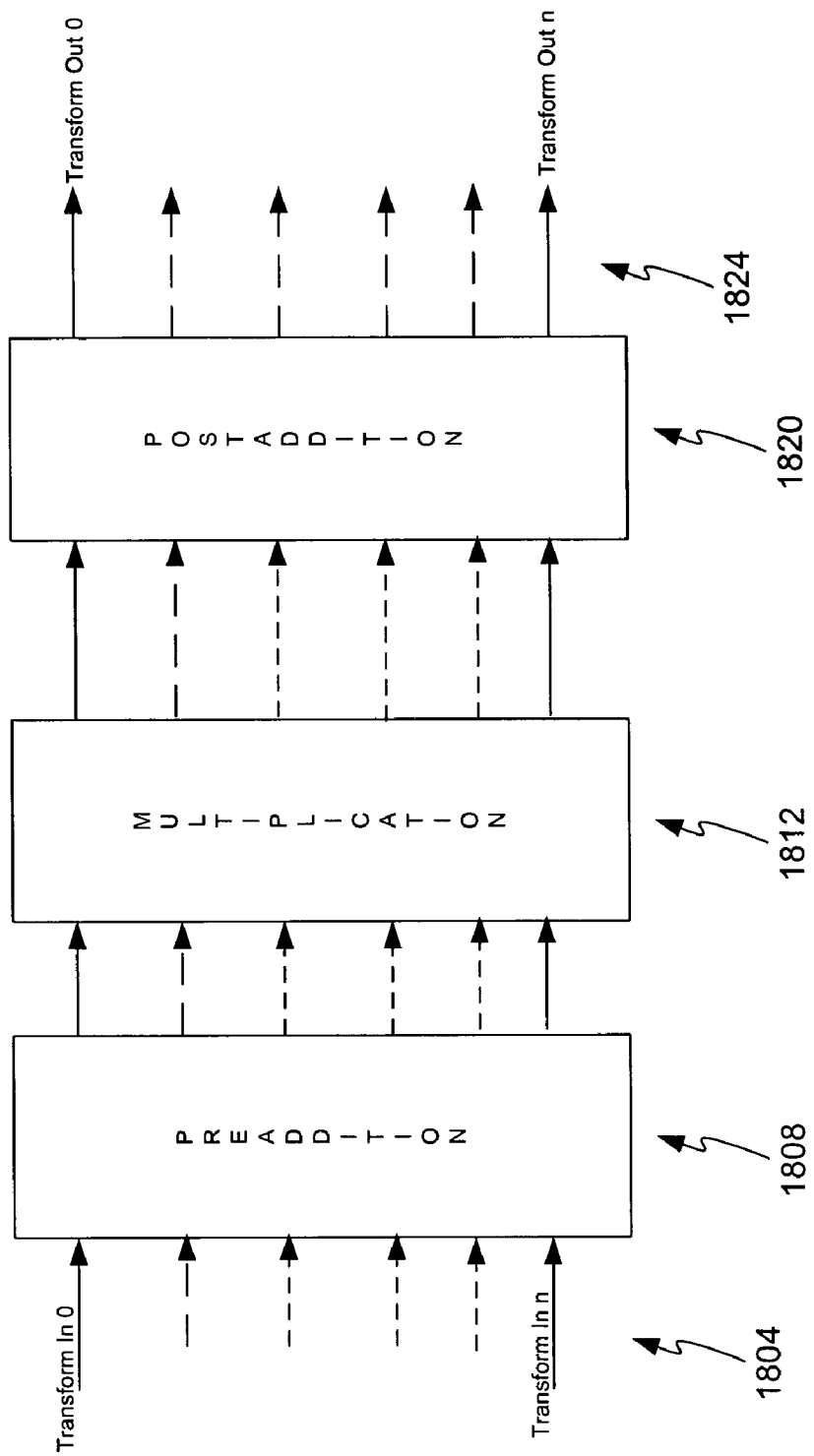
FIG. 16 illustrates an exemplary block diagram of a system configured to perform a Winograd transform.

FIG. 16 illustrates an exemplary block diagram of a system configured to perform a Winograd transform. This is but one example embodiment and as such, in other embodiments other configuration may be utilized to perform the Winograd transform. The transform may also be performed using machine readable code stored on a memory and configured to execute on a processor.

In this example embodiment, the inputs 1804 to the transform hardware provide the data from the buffer (shown in FIG. 15) to a pre-addition element 1808. In the pre-addition element, the inputs undergo addition with other inputs which reduce the number of more complex and power consuming multiplies. The outputs of the pre-addition element connect to a multiplication element 1812. The multiplication element 1812 multiplies the data from the pre-addition element 1808 with one or more fixed coefficients.

The output from the multiplication element 1812 feeds into a post additional element 1820, which performs addition on the output from the multiplication element 1812. In this embodiment, certain of the inputs are added together. The outputs 1824 are shown as transformout 0 through transformout n. For a real input signal with n values, the complex Winograd transform will return n complex values, of which floor $((n-1)/2)$ will be redundant complex conjugates. Therefore floor $((n-1)/2)$ outputs do not need to be calculated for a real input signal. The Winograd transform is generally understood by one of ordinary skill in the art and as such it is not discussed in great detail herein.

Figure 17:
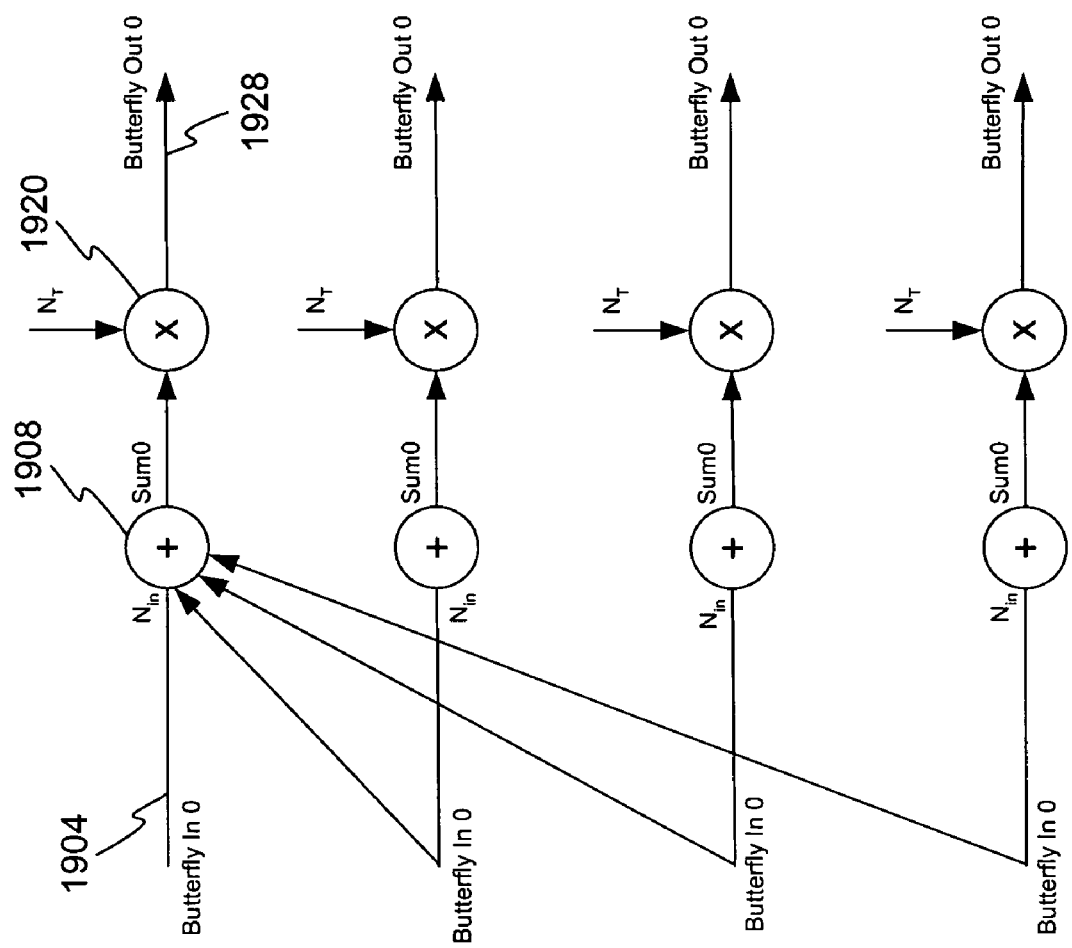
FIG. 17 illustrates an exemplary block diagram of a radix 4 transform stage.

FIG. 17 illustrates an exemplary block diagram of a radix 4 transform stage. This is but one example embodiment and as such, in other embodiments other configuration may be utilized to perform the Cooley-Tukey transform. The transform may also be performed using machine readable code stored on a memory and configured to execute on a processor.

In this discussion, the data path 0 is discussed, and the other data paths 1-data path 3 mirror data path 0. An input 1904 comprises butterfly-in-0 which connects to a summing junction 1908. The junction 1908 also receives input from the other butterfly-in inputs as shown. The summing junction 1908 combines the inputs and provides the resulting sum to a multiplier 1920 which multiplies the input by a coefficient $N_T$. $N_T$ comprises a value selected based on the time and frequency index of the value being calculated. The output of the multiplier 1920 carries the butterfly-out 0 signal on output 1928. The Cooley-Tukey operation is generally understood by one of ordinary skill in the art and as such, is not described in greater detail herein.

Figure 18:
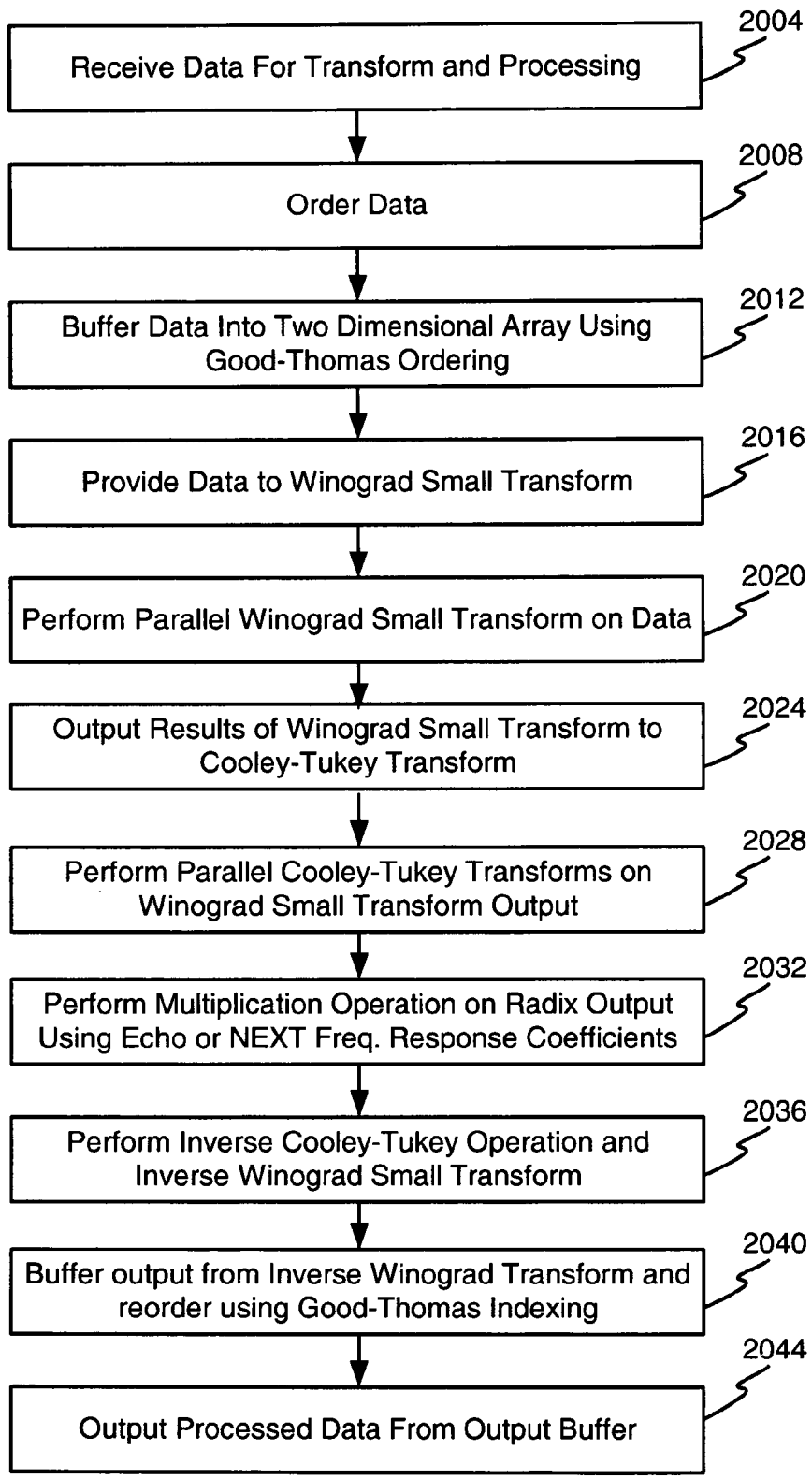
FIG. 18 illustrates an exemplary flow diagram of an example method of operation of the combined transform.

FIG. 18 illustrates an exemplary flow diagram of an example method of operation of the combined transform. This is but one possible method of operation and as such, it is contemplated that one of ordinary skill in the art may arrive at different methods of operation which do not depart from the claims that follow. In this embodiment, at a step 2004, the system receives data upon which the transform operation will occur and for additional processing. An inverse transform is also contemplated. Then at step 2008, the system orders the data. After ordering at step 2008, the operation buffers the data into a two dimensional array using Good-Thomas ordering. In this embodiment, data is buffered until the 2-D array is full.

Thereafter, at a step 2016, the operation provides the data from the buffer to the Winograd small transform. At step 2020, the Winograd small transform processor performs a Winograd small transform on the data. Multiple concurrent or sequenced transforms may occur. The results of this transform are output to a radix r transform, which in this example embodiment is a radix 4 transform. This occurs at a step 2024. At a step 2028, the operation performs a parallel Radix r transform on the output of the Winograd small transform.

At a step 2032, the operation performs a multiplication or any other scaling operation on the Cooley-Tukey output. In one embodiment, the coefficient represents the frequency content of a delayed block of the echo or near-end crosstalk response. As discussed above in greater detail, this modifies the data to reduce the echo and the crosstalk components in the received signal. After modification though multiplication or other type scaling, the operation advances to step 2036 wherein the system performs an inverse Cooley-Tukey operation and an inverse Winograd small transform. These are generally the inverse operation as described above at steps 2020 and 2028.

Then, at a step 2040, the output from the inverse Winograd small transform is buffered and reordered based on Good-Thomas indexing or any other type indexing. Any number of dimensions/length of dimensions of prime factor indexing and ordering may be utilized. Ordering may occur through use of a table look-up operation or in any other manner. Once the buffer is full, or before, depending on the order of buffering, the data is output from the buffer for subsequent processing. This occurs at step 2044.

As a benefit to this method of operation, latency is reduced due to the use of two dimensional blocks which require less complex ordering than prime factor indexing with dimensionality N>2. In addition, power consumption is reduced by using fewer elements, such as multipliers. The system also shares certain hardware, such as multipliers, which in turn reduces the size and cost of the system while also reducing leakage current. Moreover, the selected transforms are well suited to implementation in hardware, which due to the processing speed, is the selected implementation for performing the transforms. The implementation and hardware can also be parallelized to speed processing. Furthermore, the selected transforms do not require the use of a real adjust, which slows processing. Thus the overall latency is minimized while minimizing power for a hardware implementation. Compared to the real transform approaches of the prior art, the circuitry required to control the transform engine and generate indexing is much simpler and lower power.

To further aid in understanding and provide the reader with disclosure the following references are incorporated by reference in their entirety.

12.3 FFT of Real Functions, Sine and Cosine Transforms, from Numerical Recipes in C: The Art of Scientific Computing, Cambridge University Press, 1992, William H. Press, Saul A. Teukolsky, William T. Vetterling, Brian P. Flannery, pages 210-220

Nussbaumer, H J, 1982, Fast Fourier Transform and Convolution Algorithms (New York: Springer-Verlag)

In addition, the following references regarding FFT algorithms aid in understanding and provide the reader with further disclosure and are incorporated by reference in their entirety:

Duhamel & Vetterli, Fast Fourier transforms: a tutorial review and a state of the art, Signal Processing 19: 259-299

H. V. Sorensen, D. L. Jones, M. T. Heideman, and C. S. Burrus, 1987, *Real-valued fast Fourier transform algorithms, IEEE Trans. Acoust. Speech Sig. Processing* ASSP-35: 849-863.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for reducing interference in an incoming signal received at transceiver of a multi-channel communication device, the method comprising:
   receiving, in a serial format, a signal to be transmitted over a channel, the transmitted signal to be transmitted from the transceiver;
   converting the signal to a parallel format to create data representing the signal;
   performing ordering on the data based on Good-Thomas ordering;
   performing a Winograd transform on the data and then a Cooley-Tukey transform to create transform domain data;
   distributing the transform domain data to one or more multipliers;
   multiplying the transform domain data by one or more weighting variables to create a weighted transform domain signal;
   performing an inverse Cooley Tukey transform on the weighted transform domain data and then a inverse Winograd transform on the output of the inverse Cooley-Tukey transform to create cancellation data;
   performing inverse ordering on the cancellation data;
   converting the cancellation data to a serial format signal; and
   combining the cancellation signal with the incoming signal to reduce interference in the incoming signal.

2. The method of claim 1, wherein the signal comprises two or more signals and each signal is associated with a channel in the multi-channel communication.

3. The method of claim 1, wherein performing ordering on the data comprises arranging the data into a two dimensional array.

4. The method of claim 3, wherein the two dimensional array is an array having $l_w$ rows and $l_r$ columns.

5. A method for canceling interference in one or more received signals, the method comprising:
   receiving, at a transceiver, two or more outgoing signals;
   converting, with the transceiver, the two or more outgoing signals to a transform domain using a transform operation to create two or more transform domain signals, wherein the transform operation comprises a Winograd transform on the two or more outgoing signals and then performing Cooley-Tukey transforms on the output of the Winograd transform to create the two or more transform domain signals;
   processing, with the transceiver, the two or more transform domain signals with two or more weighting variables to generate two or more cancellation signals in the transform domain;
   converting, with the transceiver, the two or more transform domain cancellation signals out of the transform domain using an inverse transform operation to obtain two or more cancellation signals, wherein the inverse transform operation comprises multiple Cooley-Tukey transforms and multiple Winograd transforms; and
   combining, with the transceiver, the two or more cancellation signals with two or more receive signals to cancel interference in the one or more received signals.

6. The method of claim 5, wherein the two or more outgoing signal are arranged into a two dimensional array.

7. The method of claim 6, wherein the two or more outgoing signals are arranged in the two dimensional array based on Good-Thomas indexing.

8. The method of claim 5, wherein the processing comprises an element by element multiply operation.

9. The method of claim 5, wherein receiving one or more outgoing signals comprise receiving four outgoing signals and combining the cancellation signal with a received signal comprises combining four cancellation signals with a received signal.

10. The method of claim 9, further comprising converting, with the transceiver, the signals to data and processing a signal comprises processing data.

11. The method of claim 5, further comprising performing, with the transceiver, overlap processing on the one or more outgoing signals and the one or more cancellation signals.

12. A cancellation system for reducing interference in a received signal in a multi-channel communication device, wherein the cancellation system for each channel comprises:
an input for receiving an outgoing signal at a first transceiver, the outgoing signal in a first domain;
one or more transform units configured to manipulate the outgoing signal into a second domain signal and provide the second domain signal to at least one multiplier associated with each channel, wherein the transform unit comprises at least one Winograd transform and at least one Cooley-Tukey transform;
one or more multipliers configured to multiply the second domain signal with one or more weighting variables to create two or more cancellation signals in the second domain;
one or more inverse transform units configured to perform an inverse transform on the two or more cancellation signals in the second domain to create a cancellation signal in the second domain, wherein the transform unit comprises at least one Cooley-Tukey transform and at least one Winograd transform; and
a subtractor configured to subtract the cancellation signal that is in the second domain from a received signal.

13. The system of claim 12, wherein the one or more transform units are implemented in hardware.

14. The system of claim 12, further comprising one or more summing junctions configured to add the two or more cancellation signals in the second domain from the one or more multipliers to generate a combined cancellation signal in the second domain and output the combined cancellation signal in the second domain to the one or more inverse transform units.

15. The system of claim 12, further comprising a buffer system configured to receive and order the outgoing signal into a two dimensional array.

16. The system of claim 15, wherein the buffer system orders the data based on Good-Thomas indexing.

17. The system of claim 12, wherein the multi-channel communication device comprises a four channel communication device and each cancellation system generates a cancellation signal that accounts for the interference from each of the four channels.

18. The system of claim 12, further comprising an adaptation system configured to adaptively generate weighting variables and the adaptation system comprises a one or more transform units configured to convert an error signal to the second domain and an adaptation module configured to process the error signal in the second domain to generate the weighting variables.

19. A cancellation system for use in a multi-channel transceiver to cancel unwanted coupling comprising:
four inputs, wherein each input provides an data to the cancellation system, the data in the time domain;
one or more buffers configured to store data;
at least one Winograd transform units configured to received data from the one or more buffers, wherein each Winograd transform unit is configured to perform a Winograd transform to convert the data to processed data;
at least one Cooley Tukey transform configured to receive the processed data and perform a transform to create transform domain data;
one or more multipliers, wherein each multiplier is configured to receive the transform domain data and multiply the transform domain data with a weighting variable to create cancellation data in the transform domain;
one or more devices configured to combine the cancellation data in the 15 transform domain to create a combined cancellation data in the transform domain;
at least one Cooley-Tukey transform units configured to receive the combined cancellation signal and perform transform to create processed combined cancellation data;
at least one Winograd transform units configured to receive the processed combined cancellation data, wherein each Winograd transform unit is configured to perform a Winograd transform to convert the processed combined cancellation data to create cancellation data in the time domain.

20. The system of claim 19, wherein one or more of the Cooley-Tukey transform units and one or more of the Winograd transform units perform overlap processing and transform processing.

21. The system of claim 19, further comprising two or more devices configured to combine the cancellation signals in the transform domain.

22. The system of claim 19, wherein the one or more buffers store the data in a two dimensional array.

23. The system of claim 22, wherein the data in the one or more buffers is ordered based on Good-Thomas indexing.

24. The system of claim 19, wherein at least one of the one or more multipliers is configured to be is shared between clock cycles.

25. The system of claim 19, wherein the weighting variables are generated by an adaptation system and the adaptation system is shared between two or more channels.

26. A method for generating a cancellation signal in a cancellation system, wherein the method occurs within one or more channels of a multi-channel communication system, the method comprising:
receiving data at a hardware device, wherein the data represents two or more outgoing signals on the two or more channels in the multi-channel communication system;
processing, with the hardware device, the data using a Winograd transform and a Cooley-Tukey transform to convert each of the one or more signals into a transform domain;
distributing the one or more signals in the transform domain to one or more multipliers of the hardware device, wherein the one or more multipliers are associated with the one or more channels;
multiplying, with the one or more multipliers, the one or more signals in the transform domain by one or more weighting variables to create one or more multiplier outputs;
combining, with the hardware device, the one or more multiplier outputs to create a combined transform domain cancellation signal, wherein the transform domain cancellation signal is associated with a channel; and processing, with the hardware device, the transform domain cancellation signal to remove the cancellation signal from the transform domain.

27. The method of claim 26, wherein the cancellation signal is configured to cancel interference in the signal.

28. The method of claim 26, further comprising ordering, with the hardware device, the data, prior to processing the data, using Good-Thomas indexing or an equivalent indexing.

29. The method of claim 28, wherein ordering the data comprises ordering the data into a two dimensional array having length $l_w$ and the other dimension as $l_r$ and the elements of the array are co-prime.

30. The method of claim 26, wherein the transform domain comprises the frequency domain.

31. The method of claim 1, wherein the data comprises real data.

32. The method of claim 1, wherein performing a Winograd transform on the data and then a Cooley-Tukey transform to create transform domain data results in redundant data which reduces the latency and power consumption.

* * * * *